(12) United States Patent
Atallah et al.

(10) Patent No.: US 7,757,097 B2
(45) Date of Patent: Jul. 13, 2010

(54) METHOD AND SYSTEM FOR TAMPERPROOFING SOFTWARE

(75) Inventors: Mikhail J. Atallah, West Lafayette, IN (US); Hoi Chang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1239 days.

(21) Appl. No.: 11/190,475

(22) Filed: Jul. 27, 2005

(65) Prior Publication Data

US 2006/0031686 A1 Feb. 9, 2006

Related U.S. Application Data

(63) Continuation of application No. 09/455,580, filed on Dec. 6, 1999, now abandoned.

(60) Provisional application No. 60/152,769, filed on Sep. 3, 1999.

(51) Int. Cl.
*G06F 12/14* (2006.01)

(52) U.S. Cl. ........................ 713/187; 713/176; 713/189; 713/194

(58) Field of Classification Search ........................ None
See application file for complete search history.

(56) References Cited

U.S. PATENT DOCUMENTS

| | | | |
|---|---|---|---|
| 4,120,030 A | 10/1978 | Johnstone | |
| 4,465,901 A | 8/1984 | Best | |
| 5,493,649 A | 2/1996 | Slivka et al. | |
| 5,666,411 A | 9/1997 | McCarty | |
| 5,684,875 A | 11/1997 | Ellenberger | |
| 5,687,191 A | 11/1997 | Lee et al. | |

(Continued)

FOREIGN PATENT DOCUMENTS

WO WO 97/15051 4/1997

(Continued)

OTHER PUBLICATIONS

Chang et al. "Protecting Software Code by Guards," Proc. 1$^{st}$ ACM Workshop on Digital Rights Management (DRM 2001), Springer LNCS 2320, pp. 160-175 (2002).*

(Continued)

*Primary Examiner*—Jung Kim
(74) *Attorney, Agent, or Firm*—Bose McKinney & Evans LLP

(57) ABSTRACT

Method of protecting host application code comprising a plurality of code blocks. The method includes steps of preprocessing the host application code; obfuscating the host application code; installing guards in the host application code to protect client blocks; randomly rearranging the code blocks of the host application code; linking the rearranged host application code with other resources to produce a binary executable image; and patching the binary executable image with data values to be used by the guard. The method can be used to install a plurality of guards to form a distributed network of guards that cooperatively protect the host application code and the other guards in the network. The installation of the guards can be performed automatically using a guard formation graph; and guard formation graph customization parameters. The obfuscation step can include control flow graph merging, cloning, and data-aliasing.

19 Claims, 36 Drawing Sheets

U.S. PATENT DOCUMENTS

| | | | |
|---|---|---|---|
| 5,737,416 | A | 4/1998 | Cooper et al. |
| 5,745,573 | A | 4/1998 | Lipner et al. |
| 5,822,360 | A | 10/1998 | Lee et al. |
| 5,822,517 | A | 10/1998 | Dotan |
| 5,892,899 | A | 4/1999 | Aucsmith et al. |
| 5,892,900 | A | 4/1999 | Gintner et al. |
| 5,933,498 | A | 8/1999 | Schneck et al. |
| 6,006,328 | A | 12/1999 | Drake |
| 6,044,469 | A | 3/2000 | Horstmann |
| 6,052,780 | A | 4/2000 | Glover |
| 6,055,503 | A | 4/2000 | Horstmann |
| 6,061,449 | A | 5/2000 | Candelore et al. |
| 6,088,452 | A | 7/2000 | Johnson et al. |
| 6,119,108 | A | 9/2000 | Holmes et al. |
| 6,134,659 | A | 10/2000 | Sprong et al. |
| 6,138,119 | A | 10/2000 | Hall et al. |
| 6,175,925 | B1 | 1/2001 | Nardone et al. |
| 6,178,509 | B1 | 1/2001 | Nardone et al. |
| 6,185,683 | B1 | 2/2001 | Gintner et al. |
| 6,192,475 | B1 | 2/2001 | Wallace |
| 6,205,550 | B1 | 3/2001 | Nardone et al. |
| 6,237,786 | B1 | 5/2001 | Gintner et al. |
| 6,334,189 | B1 | 12/2001 | Granger et al. |
| 6,438,432 | B1 | 8/2002 | Zimmerman et al. |
| 6,463,538 | B1 | 10/2002 | Elteto |
| 6,480,959 | B1 | 11/2002 | Granger et al. |
| 6,594,761 | B1 | 7/2003 | Chow et al. |
| 6,779,114 | B1 * | 8/2004 | Chow et al. ............... 713/189 |
| 7,430,670 | B1 * | 9/2008 | Horning et al. ............ 713/190 |

FOREIGN PATENT DOCUMENTS

| | | |
|---|---|---|
| WO | WO 99/01815 | 1/1999 |
| WO | WO 99/64973 | 12/1999 |
| WO | WO 00/67095 | 11/2000 |
| WO | WO 00/77596 | 12/2000 |
| WO | WO 00/77597 | 12/2000 |
| WO | WO 01/14953 | 3/2001 |
| WO | WO 01/79969 | 10/2001 |
| WO | WO 03/046698 | 6/2003 |

OTHER PUBLICATIONS

Collberg, Thomborson and Low, A Taxonomy of Obfuscating Transformations, Technical Report 148, pp. 1-36, 1997.
Aucsmith, Tamper Resistant Software: An Implementation from Lecture Notes in Computer Science 1174, 1996, pp. 317-333.
Millen, Kernel Isolation for the PDP-11/70 from Proceedings of the 1982 Symposium on Security and Privacy, 1982, pp. 57-65.
Collberg and Thomborson, Software Watermarking: Models and Dynamic Embeddings, pp. 1-14.
Bashar, Krishnan, Kuhn, Spafford and Wagstaff, Low-Threat Security Patches and Tools, pp. 1-8.
Collberg, Thomborson and Low, Manufacturing Cheap, Resilient, and Stealthy Opaque Constructs, 1998, pp. 184-196.
Carolina, Software Protection Technology Legal Aspects of Software Protection Devices from the Computer Law and Security Report, 1995, pp. 188-193.
Larus and Schnarr, EEL: Machine-Independent Executable Editing, 1995, pp. 1-10.
Collberg, Thomborson and Low, Breaking Abstractions and Unstructuring Data Structures, pp. 1-11.
Sander and Tschudin, Protecting Mobile Agents Against Malicious Hosts from Lecture Notes in Computer Science 1419, Mobile Agents and Security, 1998, pp. 44-60.
Mambo, Murayama and Okamoto, A Tentative Approach to Constructing Tamper-Resistant Software from New Security Paradigms Workshop, 1997, pp. 23-33.
Kahng et al., Robust IP Watermarking Methodologies for Physical Design from Design Automation Conference, 1998, pp. 782-787.
Dwork, Lotspiech and Naor, Digital Signets: Self-Enforcing Protection of Digital Information (Preliminary Version), 1996, pp. 489-498.
Wood and Zeidler, Security Modules: Potent Information Security System Components from Computers & Security, 1986, pp. 114-121.
Necula and Lee, Research on Proof-Carrying Code for Untrusted-Code Security from 1997 IEEE Symposium on Security and Privacy, 1997, p. 204.
"Crawford, Copy Protection Methods", Dec. 1997, pp. 1-6.
Cifuentes, Cristina, Structuring Decompiled Graphs, Proceedings of the International Conference on Computer Construction, pp. 91-105, Linkoping, Sweden, 1996.
Larus, James, Whole Program Paths, SIGPLAN PLDI, May 1999.
Schulman, Andrew, Examining the Windows AARD Detection Code, Dr. Dobb's Journal, vol. 18, No. 9, Sep. 1993, pp. 42, 44-48, 89.
White, Steve R., and Comerford, Liam, Abyss: An Architecture for Software Protection, IEEE Transactions on Software Engineering, vol. 16, No. 6, Jun. 1990, pp. 619-629.
Abadi et al., "On Hiding Information from an Oracle", 1989, Journal of Computer and System Sciences, 39, pp. 1-29.
Abadi et al., "Secure Circuit Evaluation", 1990, Journal of Cryptology, 3, pp. 1-12.
Matsumoto et al., "Speeding Up Secret Computations with Insecure Auxiliary Devices", 1990, Springer-Verlag, pp. 497-506.
Casanova et al., "Netsolve: A Network Server for Solving Computational Science Problems", 1996, Univ. of Tennessee, pp. 1-14.
Atallah et al., "Secure Outsourcing of Scientific Computations", Purdue Univ., Oct. 16, 2000, pp. 1-56.

* cited by examiner

// template 1

```
        movl        $RANDOM_1, CHECKSUM_1    // RANDOM_1 = any integer
        movl        $START_1, TEMP_1
LABEL_1:
        cmpl        $END_1, TEMP_1
        jg          LABEL_2
        addl        (TEMP_1), CHECKSUM_1
        addl        $RANDOM_2, TEMP_1        // RANDOM_2 in [3,5]
        jmp         LABEL_1
LABEL_2:
```

// template 2

```
        movl        $START_1+END_1+RANDOM_1, TEMP_1    // RANDOM_1 = any
                                                       integer
        xorl        CHECKSUM_1, CHECKSUM_1
        movl        TEMP_1, CHECKSUM_2
LABEL_1:
        addl        -END_1-RANDOM_1(TEMP_1), CHECKSUM_1
        xorl        -END_1-RANDOM_1+3(TEMP_1), CHECKSUM_2
        subl        $-RANDOM_2, TEMP_1       // RANDOM_2 in [3,5]
        cmpl        $END_1+END_1+RANDOM_1, TEMP_1
        jle         LABEL_1
```

FIG. 3

$$
\begin{aligned}
&(x+3)(y+7) & &&(1)\\
=\ & (x+3+0)(y+7+0) & &&(2)\\
=\ & (x+3+u-u_0)(y+7+w_0-w) & \text{iff } u=u_0 \text{ and } w=w_0 &&(3)\\
=\ & (x+u+k_1)(y-w+k_2) & \text{where } k_1=3-u_0 \text{ and } k_2=7+w_0 &&(4)
\end{aligned}
$$

FIG. 4

```
1   main:
2            leal     -4(%esp), %esp
3            movl     %ebp, (%esp)
4            movl     %esp, %ebp
5            subl     $8, %esp
6            leal     -8(%ebp), %eax
7            leal     -4(%esp), %esp
8            movl     %eax, (%esp)
9            leal     -4(%esp), %esp
10           movl     $str1, (%esp)
11           leal     -4(%esp), %esp
12           movl     $next1, (%esp)
13           jmp      scanf
14
15  next1:                                   // start of client
16           addl     $8, %esp
17           leal     -4(%esp), %esp
18           movl     -8(%ebp), %eax
19           movl     %eax, (%esp)
20           leal     -4(%esp), %esp
21           movl     $next2, (%esp)
22           jmp      pr_fact
23  end1:                                    // end of client
24
25  next2:
26           addl     $4, %esp
27           movl     %ebp, %esp
28           movl     (%esp), %ebp
29           leal     4(%esp), %esp
30           leal     4(%esp), %esp
31           jmp      *-4(%esp)
32
33  pr_fact:
34           leal     -4(%esp), %esp
35           movl     %ebp, (%esp)
36           movl     %esp, %ebp
37           subl     $4, %esp
38
39           // guard installation site
40
41           movl     $100, g1
42           movl     $next1, %eax
43  guard1_1:
44           cmpl     $end1, %eax
45           jg       guard1_2
46           movl     g1, %ecx
47           addl     (%eax), %ecx
48           movl     %ecx, g1
49           addl     $3, %eax
50           jmp      guard1_1
51  guard1_2:
52
53           // end of checksumming: (g1,G1)
54
55           movl     $-G1+1, %eax          // G1 is the checksum constant
56           addl     g1, %eax
```

FIG. 6

| | | | |
|---|---|---|---|
| 57 | | movl | $str2, (%esp) |
| 58 | | leal | -4(%esp), %esp |
| 59 | | movl | $next3, (%esp) |
| 60 | | jmp | printf |
| 61 | | | |
| 62 | next3: | | |
| 63 | | addl | $8, %esp |
| 64 | | movl | %ebp, %esp |
| 65 | | movl | (%esp), %ebp |
| 66 | | leal | 4(%esp), %esp |
| 67 | | leal | 4(%esp), %esp |
| 68 | | jmp | *-4(%esp)    // jump to addr in mem[%esp-4] |
| 69 | | | |

FIG. 6 CONTINUED

```
1   main:
2           leal    -4(%esp), %esp      // %esp := %esp - 4
3           movl    %ebp, (%esp)        // mem[%esp] := %ebp
4           movl    %esp, %ebp
5           subl    $8, %esp            // %esp := %esp - 8
6           leal    -8(%ebp), %eax
7           leal    -4(%esp), %esp
8           movl    %eax, (%esp)
9           leal    -4(%esp), %esp
10          movl    $str1, (%esp)
11          leal    -4(%esp), %esp
12          movl    $next1, (%esp)      // mem[%esp] := $next1
13          jmp     scanf               // jump to location scanf
14
15  next1:
16          addl    $8, %esp            // %esp := %esp + 8
17          leal    -4(%esp), %esp
18          movl    -8(%ebp), %eax      // %eax := mem[%ebp-8]
19          movl    %eax, (%esp)
20          leal    -4(%esp), %esp
21          movl    $next2, (%esp)
22          jmp     pr_fact
23
24  next2:
25          addl    $4, %esp
26          movl    %ebp, %esp
27          movl    (%esp), %ebp
28          leal    4(%esp), %esp
29          leal    4(%esp), %esp
30          jmp     *-4(%esp)
31
32  pr_fact:
33          leal    -4(%esp), %esp
34          movl    %ebp, (%esp)
35          movl    %esp, %ebp
36          subl    $4, %esp
37          movl    $1, -4(%ebp)
38          jmp     .L94
39
40  .L94:
41          cmpl    $1, 8(%ebp)         // mem[%ebp+8] - 1 == ??
42          jg      .L96                // if ?? > 0, jmp .L96
43          jmp     .L98
44
45  .L96:
46          movl    -4(%ebp), %eax
47          imul    8(%ebp), %eax       // %eax := %eax * mem[%ebp+8]
48          movl    %eax, -4(%ebp)
49          subl    $1, 8(%ebp)
50          jmp     .L94
51
52  .L98:
53          leal    -4(%esp), %esp
54          movl    -4(%ebp), %eax
55          movl    %eax, (%esp)
56          leal    -4(%esp), %esp
```

FIG. 7

```
57              movl    %eax, -4(%ebp)
58              jmp     .L94
59
60   .L94:
61              leal    8+G1(%ebp), %eax
62              subl    g1, %eax
63              movl    (%eax), %eax
64              cmpl    $1, %eax
65              jg      .L96
66              jmp     .L98
67
68   .L96:
69              movl    -4(%ebp), %eax
70              imul    8(%ebp), %eax
71              movl    %eax, -4(%ebp)
72              subl    $1, 8(%ebp)
73              jmp     .L94
74
75   .L98:
76              leal    -4(%esp), %esp
77              movl    -4(%ebp), %eax
78              movl    %eax, (%esp)
79              leal    -4(%esp), %esp
80              movl    $str2, (%esp)
81              leal    -4(%esp), %esp
82              movl    $next3, (%esp)
83              jmp     printf
84
85   next3:
86              addl    $8, %esp
87              movl    %ebp, %esp
88              movl    (%esp), %ebp
89              leal    4(%esp), %esp
90              leal    4(%esp), %esp
91              jmp     *-4(%esp)
92
```

FIG. 7 CONTINUED

```
1   main:
2           movl    $38, g2                      // g2=38                      <38>
3           movl    $main_2+30, %eax
4           subl    g2, %eax
5           movl    %eax, g3                     // g3=main_2+30-g2            <main_2-8>
6           jmp     main_1
7           // g2=<38>, g3=<main_2-8>
8   main_1:
9   pr_fact:
10          leal    -4(%esp), %esp
11          subl    $30, g2                      // g2=g2-30                   <8,4>
12          movl    %ebp, (%esp)
13          movl    g2, %ebp
14          addl    %ebp, g3                     // g3=g3+g2                   <main_2,pr_fact_1>
15          movl    %esp, %ebp
16          subl    g2, %esp
17          movl    g3, %eax
18          jmp     *%eax
19          // g1=<,?> g2=<8,4>, g3=<main_2,pr_fact_1>
20  main_2:
21          addl    $26, g2                      // g2=g2+26                   <34>
22          leal    -8(%ebp), %eax
23          leal    -4(%esp), %esp
24          movl    %eax, (%esp)
25          leal    -4(%esp), %esp
26          movl    $str1, (%esp)
27          leal    -4(%esp), %esp
28          movl    $next1, (%esp)
29          jmp     scanf
30          // g2=<34>
31  next1:  // client start
32          addl    $8, %esp
33          leal    -4(%esp), %esp
34          movl    $pr_fact_1-38, %eax
35          addl    g2, %eax
36          movl    %eax, g3                     // g3=g2+pr_fact_1-38         <pr_fact_1-4>
37          movl    -8(%ebp), %eax
38          movl    %eax, (%esp)
39          leal    -4(%esp), %esp
40          movl    $next2, (%esp)
41          jmp     pr_fact
42          // g2=<34>, g3=<pr_fact_1-4>
43  end1:   // client end
44  next2:
45          addl    $4, %esp
46          movl    %ebp, %esp
47          movl    (%esp), %ebp
48          leal    4(%esp), %esp
49          leal    4(%esp), %esp
50          jmp     *-4(%esp)
51  pr_fact_1:                                   // guard installation site
52          movl    $100, g1
53          movl    $next1, %eax
54          jmp     guard1_1
55          // g1=<?>
56  guard1_1:
```

FIG. 13

```
57              cmpl     $end1, %eax
58              jg       guard1_2
59              jmp      guard1_3
60              // g1=<?>
61  guard1_3:
62              movl     g1, %ecx
63              addl     (%eax), %ecx
64              movl     %ecx, g1
65              addl     $3, %eax
66              jmp      guard1_1
67              // g1=<?>
68  guard1_2:
69              // end of checksumming: (g1,G1)              // g1=<G1>
70              movl     $-G1+1, %eax
71              addl     g1, %eax
72              movl     %eax, -4(%ebp)
73              jmp      .L94
74              // g1=<G1>
75  .L94:
76              leal     8+G1(%ebp), %eax
77              subl     g1, %eax
78              movl     (%eax), %eax
79              cmpl     $1, %eax
80              jg       .L96
81              jmp      .L98
82              // g1=<G1>
83  .L96:
84              movl     -4(%ebp), %eax
85              imul     8(%ebp), %eax
86              movl     %eax, -4(%ebp)
87              subl     $1, 8(%ebp)
88              jmp      .L94
89  .L98:
90              leal     -4(%esp), %esp
91              movl     -4(%ebp), %eax
92              movl     %eax, (%esp)
93              leal     -4(%esp), %esp
94              movl     $str2, (%esp)
95              leal     -4(%esp), %esp
96              movl     $next3, (%esp)
97              jmp      printf
98  next3:
99              addl     $8, %esp
100             movl     %ebp, %esp
101             movl     (%esp), %ebp
102             leal     4(%esp), %esp
103             leal     4(%esp), %esp
104             jmp      *-4(%esp)
105
```

FIG. 13 CONTINUED

```
1   main:
2           movl    $38, g2                     // g2=38                        <38>
3           movl    $scanf-1000, g5             // g5=scanf-1000                <scanf-1000>
4           movl    $main_2+30, %eax
5           subl    g2, %eax
6           movl    %eax, g3                    // g3=main_2+30-g2              <main_2-8>
7           jmp     main_1
8   // g2=<38>, g3=<main_2-8>, g5=<scanf-1000>
9   main_1:
10  pr_fact:
11          leal    -4(%esp), %esp
12          subl    $30, g2                     // g2=g2-30                     <8,4>
13          movl    %ebp, (%esp)
14          movl    g2, %ebp
15          addl    %ebp, g3                    // g3=g3+g2                     <main_2,pr_fact_1>
16          movl    %esp, %ebp
17          subl    g2, %esp
18          movl    $1000, %eax
19          addl    g5, %eax
20          movl    %eax, g4                    // g4=g5+1000                   <scanf>
21          movl    g3, %eax
22          jmp     *%eax
23  // g1=<,?> g2=<8,4>, g3=<main_2,pr_fact_1>, g4=<scanf,>
24  main_2:
25          addl    $26, g2                     // g2=g2+26                     <34>
26          movl    $next1-794320, %eax
27          addl    g2, %eax
28          movl    %eax, g1                    // g1=g2+next1-794320           <next1-794286>
29          leal    -8(%ebp), %eax
30          leal    -4(%esp), %esp
31          movl    %eax, (%esp)
32          leal    -4(%esp), %esp
33          movl    $str1, (%esp)
34          jmp     main_2_1
35  // g1=<next1-794286>, g2=<34>, g4=<scanf>
36  next1:  // client start
37          addl    $8, %esp
38          leal    -4(%esp), %esp
39          movl    $pr_fact_1-38, %eax
40          addl    g2, %eax
41          movl    %eax, g3                    // g3=g2+pr_fact_1-38           <pr_fact_1-4>
42          addl    $next2-794286-next1, g1     // g1=g1+next2-794286-next1     <next2-794286>
43          movl    $pr_fact, g4                // g4=pr_fact                   <pr_fact>
44          movl    -8(%ebp), %eax
45          movl    %eax, (%esp)
46          jmp     next1_1
47  // g1=<next2-794286>, g2=<34>, g3=<pr_fact_1-4>, g4=<pr_fact>
48  next1_1:
49  main_2_1:
50  .L98_1:
51          leal    -4(%esp), %esp
52          addl    $794286, g1                 // g1=g1+794286                 <next1>
53          movl    g1, %eax
54          movl    %eax, (%esp)
55          movl    g4, %eax
56          jmp     *%eax
```

FIG. 14

```
57                      // g1=<next2,next1,next3>, g2=<34,34,>, g3=<pr_fact_1-4,,>,
58                      // g4=<pr_fact,scanf,printf>, g5=<?>
59    end1:             // client end
60    next2:
61              addl    $4, %esp
62              movl    %ebp, %esp
63              movl    (%esp), %ebp
64              leal    4(%esp), %esp
65              leal    4(%esp), %esp
66              jmp     *-4(%esp)
67    pr_fact_1:        // guard installation site
68              movl    $100, g1                                    <?>
69              movl    $next1, %eax
70              jmp     guard1_1
71              // g1=<?>
72    guard1_1:
73              cmpl    $end1, %eax
74              jg      guard1_2
75              jmp     guard1_3
76              // g1=<?>
77    guard1_3:
78              movl    g1, %ecx
79              addl    (%eax), %ecx
80              movl    %ecx, g1
81              addl    $3, %eax
82              jmp     guard1_1
83              // g1=<?>
84    guard1_2:
85              // end of checksumming: (g1,G1)
86              movl    $printf-G1, %eax
87              addl    g1, %eax
88              movl    %eax, g4                    // g4=g1+printf-G1
89              movl    $-G1+1, %eax
90              addl    g1, %eax
91              movl    %eax, -4(%ebp)
92              jmp     .L94
93              // g1=<G1>, g4=<printf>
94    .L94:
95              leal    8+G1(%ebp), %eax
96              subl    g1, %eax
97              movl    (%eax), %eax
98              cmpl    $1, %eax
99              jg      .L96
100             jmp     .L98
101             // g1=<G1>, g4=<printf>
102   .L96:
103             movl    -4(%ebp), %eax
104             imul    8(%ebp), %eax
105             movl    %eax, -4(%ebp)
106             subl    $1, 8(%ebp)
107             jmp     .L94
108             // g4=<printf>
109   .L98:
110             addl    $-G1+next3-794286, g1       //g1=g1-G1+next3-794286  <next3-794286>
111             leal    -4(%esp), %esp
112             movl    -4(%ebp), %eax
```

FIG. 14 CONTINUED

```
113             movl     %eax, (%esp)
114             leal     -4(%esp), %esp
115             movl     $str2, (%esp)
116             jmp      L98_1
117             // g1=<next3-794286>, g4=<printf>
118   next3:
119             addl     $8, %esp
120             movl     %ebp, %esp
121             movl     (%esp), %ebp
122             leal     4(%esp), %esp
123             leal     4(%esp), %esp
124             jmp      *-4(%esp)
125
```

FIG. 14 CONTINUED

Procedure precompute (variable v, link-nodes {x_1,...,x_n},
                              constants {c_1,...,c_n})

Set live(v,x_i) = TRUE and value(v,x_i) = c_i for all i = 1,...,n;

While (there is a link-node x and a variable v such that
          value(v,x) is defined but done(v,x)==FALSE)

Let X = {x_1,...,x_n} be the entire set of link-nodes in the
           same basic block, say B, that contains x;
      Let t be the point within B for inserting evolve( );

If (no evolve( ) has previously been chosen for B)
         Choose a mathematical function evolve(U), where U is a (possibly
           empty) set of (new) global variables, with the following properties:
         (1)   No u in U is reserved (i.e. no u in U that, for some z in pred-
               links(X), live(u,z)==TRUE but value(u,z) is undefined);
         (2)   For any x_i in X where value(v,x_i) is defined, the common
               evolve(U) is able to fulfill value(v,x_i) by setting value(u,z)
               appropriately, for any u in U and z in pred-links(x_i) with
               unseen(u,z,t)==TRUE;
         (3)   For all x_i in X where value(v,x_i) is undefined, the same
               evolve(U) is possible to fulfill any desired value for any future
               definition of value(u,x_i);

End if

If (evolve( ) is newly chosen and is not the trivial identity function)
         Insert code at t of B for computing v=evolve(U);
      End if For (all u in U and z in pred-links(x) where unseen(u,z,t)==TRUE)
         Set live(u,z) = TRUE and value(u,z) equal to some values such that these
           new values, together with other values of U already set along the paths to t
           through z, satisfy value(v,x)==evolve(U);
      End for For (each x_i in X where value(v,x_i) is undefined, and each u in U and z in
         pred-links(x_i) where unseen(u,z,t)==TRUE)
         Set live(u,z) = TRUE;
      End for Set done(v,x) = TRUE;
   End while
End procedure

FIG. 19

Procedure unseen(variable v, link-node z, program point t)
    If (value(v,z) is undefined, and at the basic block that contains t, v is not defined in the code before t)
        return TRUE;
    Else
        return FALSE;
    End procedure

FIG. 19 CONTINUED

// (a) before change
   ...
   jmp        .L24

// (b) after change
   ...
   cmpl      %eax, (%esp)    // args are randomly selected
   jl         .L013           // clone
   jmp       .L24

FIG. 22

| tag | sh f | E(len + sh f) | E(msg + sh f) |

FIG. 24

| High-level instructions | Simpler instructions |
|---|---|
| call   *operand*<br>next:  ... | pushl  $next<br>jmp   *operand*<br>next:  ... |
| ret | leal   4(%esp), %esp<br>jmp   * −4(%esp) |
| enter | pushl  %ebp<br>movl   %esp, %ebp |
| leave | movl   %ebp, %esp<br>popl   %ebp |
| pushl  *operand* | leal   −4(%esp), %esp<br>movl   *operand*, (%esp) |
| popl  *operand* | movl   (%esp), *operand*<br>leal   4(%esp), %esp |

FIG. 27

| Software Program Code | Encrypted customization parameters | Digital signature |
|---|---|---|
|  |  |  |

FIG. 28

| Wrong password | After "bypassing" password |
|---|---|
| password: abc<br>Invalid password! | password: abc<br>n ? 100000<br>next prime = 100001 |
| Right password | After further "corrections" |
| password: opensesame<br>n ? 100000<br>next prime = 100003 | password: abc<br>n ? 100000<br>Segmentation Fault (core dumped) |

FIG. 29

METHOD AND SYSTEM FOR TAMPERPROOFING SOFTWARE

This application is a continuation of U.S. patent application Ser. No. 09/455,580, filed Dec. 6, 1999, now abandoned which claims the benefit of U.S. Provisional Application No. 60/152,769, filed Sep. 3, 1999, the disclosures of which are expressly incorporated herein by reference.

BACKGROUND OF THE INVENTION

1. Field of the Invention

The present invention relates to the field of software program security, and more specifically, the present invention relates to a method and system for producing tamperproof software programs.

2. Description of the Prior Art

In the modern software industry, software program vendors suffer huge losses due to the illegal distribution of software programs, a practice known commonly as software piracy. Part of the problem of software piracy is due to the fact that software programs, distributed as electronic files, are vulnerable to modifications by users. Thus, even those software programs that enforce online registrations prior to their legal use as a means of preventing unauthorized use can be modified by a malicious user (a "hacker") to bypass the online registration process. Such compromised software programs can be massively duplicated and distributed, particularly in countries that do not provide the same legal protections to copyright owners as are found under United States law, and also in countries where software program vendors have less control over their products. As a result, software copyright owners lose significant revenue from lost sales and the development of competitive programs based on pirated copies of the copyrighted software.

It is known in the art to embed security mechanisms in the software program code in an attempt to hinder the efforts of hackers. One such mechanism well known in the art is to require the initial user to input a serial number into the software program prior to the initial use of the software program. The software program then will apply this serial number to an embedded algorithm to compute the true serial number of the software program, thereby validating the authenticity of the software program copy. This type of embedded security mechanism and others like it are vulnerable to compromise because such mechanisms often are based entirely on a few machine instructions within the software program. For example, many software programs use only a single instruction, typically a conditional jump, to compare the serial number entered by the initial user with the serial number computed by the software program to determine whether the software program copy is authentic. The use of a single instruction for this important security step provides the hacker with a single point of attack to defeat the security mechanism. To defeat such a mechanism, the hacker merely needs to find the conditional instruction in the code and replace it in the binary file with an unconditional instruction that advances the execution flow of the software program to the desired location, bypassing the serial number comparison step. Another approach employed by hackers to defeat such a security mechanism is to insert a sequence of small null operations that do nothing except advance the execution flow of the software program to the desired location naturally. Either kind of modification allows illegal software program users to freely run the compromised software programs.

There are several more advanced security mechanisms known in the art, but their results and applicability have not been promising to the software industry. One such advanced security mechanism uses special hardware that directly executes an encrypted software program without the software program's underlying binary code ever being disclosed in memory. The details of this method are disclosed in U.S. Pat. No. 4,465,901 to Best. Further disclosure of a similar method is made by White et al. in an article entitled "ABYSS: An Architecture for Software Protection," published in *IEEE Transactions on Software Engineering,* 16(6):619-629, June 1990. While this approach solves the problem, it has a major disadvantage in that encryption keys and special hardware are required for encrypting and executing the software program. Because of the need for encryption keys and special hardware, the result is a security mechanism that is more expensive and provides less user flexibility than a security mechanism which relies entirely on software-based techniques.

Another security mechanism known in the art is the use of code obfuscation, which makes the code difficult for a hacker to understand and analyze. Methods of code obfuscation are disclosed by Collberg et al. in an article entitled, "Breaking Abstractions and Unstructuring Data Structures," published in *IEEE International Conference on Computer Languages, ICCL'98,* Chicago, Ill., USA, May 1998.; by Collberg et al. in an article entitled, "A Taxonomy of Obfuscating Transformations," published as Technical Report 148, Department of Computer Science, The University of Auckland, Private Bag 92019, Auckland, New Zealand, 1998; by Bashar et al. in an article entitled, "Low-Threat Security Patches and Tools," published as Technical Report CSD-TR-96-075, Coast TR 97-10, COAST Laboratory, Department of Computer Sciences, Purdue University, 1996; and by Mambo et al. in an article entitled, "A Tentative Approach to Constructing Tamper-Resistant Software," published in *New Security Paradigms Workshop. Proceedings,* pages 23-33, New York, N.Y., USA, 1998. Unfortunately, techniques currently known in the art of code obfuscation still are not adequate to prevent sophisticated software program hackers from identifying and modifying attack targets in the code.

Joepgen et al. disclose in their article entitled, "Software by Means of the 'Protprog' Method, Part II" published in *Elektronik,* 42(17):52-56, August 1993, another security mechanism known in the art utilizes "self-modifying code," wherein the software program code generates other code at run-time.

Schulman discloses in his article entitled, "Examining the Windows AARD Detection Code," published in *Dr. Dobb's Journal,* 18(9):42,44-8,89, September 1993, another security mechanism known in the art utilizes code encryption and decryption, wherein partially encrypted code self-decrypts at run-time.

Aucsmith discloses in his article entitled, "Tamper Resistant Software: An Implementation," Ross Anderson, editor, published in *Information Hiding—Proceedings of the First International Workshop,* volume 1174 of *LNCS,* pages 317-333, May/June 1996, yet another security mechanism which utilizes a hybrid of the self-modifying code technique and the code encryption/decryption technique. U.S. Pat. No. 5,892,899 to Aucsmith et al. discloses a similar mechanism.

Several disadvantages are present in the prior art security mechanisms. First, the mechanisms which utilize self-modifying and self-decrypting code produce an extra burden on the computing resources at run-time. Second, the Integrity Verification Kernels ("IVK") disclosed by Aucsmith in his article are relatively large segments of code. Because the IVKs must be decrypted during program execution and then subsequently encrypted, the program execution performance degrades. In addition, the design of Aucsmith's IVKs make the IVK concept difficult to apply to larger IVKs. The processing time involved in decrypting and encrypting the larger IVKs may degrade program execution performance to the point where it is intolerable to the end-user. Furthermore, the first cell of each IVK is unencrypted. The large size of the IVKs and the presence of the unencrypted first cell may provide clues to a hacker as to the location of the security mechanism within the code. Third, the security mechanism disclosed by Aucsmith in his article requires special services from the operating system software for proper execution. The resultant interaction between the security mechanism and the operating systems software may direct a hacker to the location of the security mechanism or to sensitive areas of the code. Finally, most prior art security mechanisms produce immediate program execution failures upon tampering. Such immediate failures provide additional clues for hackers as to the location of the security mechanisms or the sensitive areas of the code.

Thus, such prior art software security mechanisms, tend to be restricted in their applicability, and they have not been widely adopted by the software industry. It is desired in the software industry to develop a method for protecting a software application program from unauthorized modification which will not require special hardware, self-modifying code, or code encryption and decryption. It is further desired that the method will not require special operating system services and that the method will produce subtle errors rather than immediate program failure.

SUMMARY OF THE INVENTION

The present invention comprises a software-only, non-cryptographic method for solving the software program security problem, and a system for practicing the method. The method utilizes self-protecting code ("SPC"), whereby a software program is armed internally with self-protection mechanisms that may render the software program unusable whenever its protected code is tampered with. The software program's self-protection mechanism is transparent to normal users. If no software program tampering has occurred, the software program executes normally as if it was unprotected. If tampering has occurred, the SPC operates to interrupt normal application software program execution. The SPC may modify the software program instructions or software program data which resides in the computer's random access memory. The modified instructions or data will not become evident until the next time the software program accesses the memory location containing the instructions or data. The end result will be erroneous software program execution such as errors in the results of mathematical algorithms. At its extreme case, the end result may be complete failure of program execution. Alternatively, the SPC be designed to operate in a less transparent manner. It may operate to halt program execution immediately, or may cause a message to be sent to the user's computer terminal or printer, or may caused a message to be stored in computer memory for future use by the software program.

One advantage of SPC is to substantially increase the cost of tampering. Because of its self-defensive and otherwise user-transparent behavior, SPC is suitable for software programs that will be used in unknown or possibly hostile user environments.

The system of the present invention may be a software program which receives as input at least one assembly language software program, object code software program, or binary executable software program to be protected, a set of watermarks to be embedded into the assembly language software programs, a set of object files or libraries with which the set of assembly language software programs will be linked, and the customization parameters required by method of the present invention. The output of the system will be a binary executable software program with embedded SPC. The system may comprise part of a standard compiler for use with a high-level computer programming language.

DESCRIPTION OF THE DRAWINGS

The features and advantages of this invention, and the manner of attaining them, will be more apparent and better understood by reference to the following descriptions of embodiments of the invention taken in conjunction with the accompanying drawings, wherein:

FIG. 3 shows two examples of checksumming templates according to the present invention.

FIG. 4 shows an example of expression rewriting to incorporate conditional identities according to the present invention.

FIG. 6 shows an example of assembly language code which computes and prints the factorial of a positive integer.

FIG. 7 shows the assembly language code of FIG. 6 with a guard installed according to the present invention at the site identified in FIG. 7.

FIG. 13 shows the sample assembly language code of FIG. 6 after its code has completed the first phase of code merging according to CFG merging assembly language software code obfuscating technique of the present invention.

FIG. 14 shows the sample assembly language code from FIG. 13 after the second phase of code merging according to the CFG merging assembly language software code obfuscating technique of the present invention.

FIG. 19 shows an algorithm for performing data precomputation according to the present invention.

FIG. 22 shows an example of a randomized jump-based decision based on two variables after the process of CFG cloning according to the present invention has been performed.

FIG. 24 shows the process of encoding a watermark message into a sequence of byte strings according to the present invention.

FIG. 27 shows a table illustrating several examples according to the present invention where high-level semantics shown in the left column of the table are replaced by groups of simpler instructions with the same semantics shown in the right column.

FIG. 28 shows the process of attaching a digital signature and encrypted customization parameters to the end of a host application software program file according to the present invention.

FIG. 29 shows a table illustrating the actions of a self-protecting software program of the present invention which produces incorrect results whenever its code is altered, even on inserting a single null instruction into the code.

DESCRIPTION OF THE INVENTION

Figure 1:
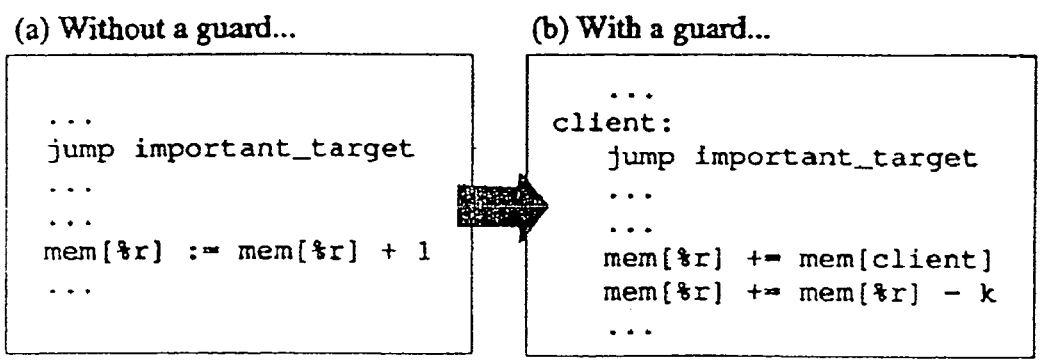
FIG. 1 shows software code in operation without a guard, and then with a simple guard example of the present invention.

The present invention comprises a software-only, non-cryptographic method for solving the problem of unauthorized modification of software program code, and a system for practicing the method. The method utilizes self-protecting code, whereby the protected application software programs, known as the "host" application software programs, are armed with internal self-protection mechanisms known as "guards" that may render the host application software program unusable whenever the guarded code is tampered with. An "application software program" is one that is executed by an operating system, and is portable in the sense that source code for an application software program may be compiled by techniques well known in the art into one of many different assembly languages for use with one of many different microprocessors and one of many different operating systems. As used in this specification and the claims, a "guard" is a portion of software code of a host application program (but not operating system program) that evaluates the integrity of one or more "code blocks" of the same host application program, or of another guard, and takes a predetermined and possibly delayed action inconsistent with the proper execution of the host application software program (a "defensive action") if the guard detects a deficiency in the integrity of the evaluated code block of the host application software program. A guard comprises at least one program instruction. A program instruction comprises at least one byte sequence.

A "code block" of an application software program is a contiguous area of the application software program containing any byte sequence, but is less than the entire application software program. The same byte sequence may comprise one or more code blocks of an application software program. Often, a code block to be protected by a guard, known as a "client code block," may be an entire function or named procedure, although a client code block could be smaller than a single instruction. A guard may have more than one client code block.

The terms "random" and "randomly" and "randomized" and "randomization" when used herein mean that no apparent pattern is present in that activities associated with such terms. The use of such terms does not necessarily imply the use of a uniform distribution or of any other well known statistical distribution.

The defensive action taken by a guard could be to halt program execution or to cause a message to be sent to the user's computer terminal or printer, but such a defensive action taken immediately upon the detection of the integrity deficiency could be undesirable because it could assist a hacker in determining and disabling the location of the guard within the host application program. In one embodiment of the present invention, the defensive action is to modify the contents of all or a portion of the data upon which the host application software operates. Accordingly, as the host application software program continues to execute, the modified data likely will cause other noticeable errors, and it will be more difficult for a hacker to determine when and where the data was modified. Alternatively, the defensive action could be to overwrite the contents of a portion of the executable program instructions in computer memory, although this approach is not preferred. Any modification could be done with pre-determined data or data randomly and automatically generated by the guard. Data areas to be modified could be specified in advance by the person creating the tamper-resistant software, known as the "user," or preferably could be selected randomly and automatically by the present invention. In another embodiment of the present invention, the defensive action is to cause a message to be stored in computer memory for future use by the application software program.

In one embodiment of the present invention, a guard uses one or more checksums to verify the integrity of one or more client code blocks. A "checksum" is a value calculated from one or more code blocks that is likely to change if such code block(s) is modified.

Normally, guards will be designated to protect code blocks of an application software program in which particularly sensitive data is processed, such as encryption or decryption routines (if any), processing of passwords used by the application software program, or where important calculations are made. Optionally, a guard may contain, between its beginning and ending program instructions, other program instructions from the original application program, so that the "guard" code and the original code are interwoven.

A client code block to be monitored by a guard may include only static byte sequences that do not change during program execution, or may include self-modifying code or self-decrypting code. If the client code block includes self-modifying code or self-decrypting code, it is essential that the self-modifying code or self-decrypting code be in the state of self-modification or self-decryption expected by the guard at the point of program execution where integrity of the client code block is verified by the guard. If the self-modifying code or self-decrypting code is not in the expected state, the guard may erroneously take a defensive action.

FIG. 1 shows software code in operation without a guard, and then with a simple guard example of the present invention. The code in part (a) of FIG. 1 having no guard has been transformed to the code in part (b) of FIG. 1 through the installation of a guard. Both part (a) and part (b) are functionally equivalent, except that the guard in part (b) of FIG. 1 protects the jump instruction (the client code block) from being modified, provided that mem[client] contains the whole jump instruction. In part (b) of FIG. 1, k has the value of mem[client]−1, and the code increments mem[%r] correctly if and only if the jump instruction is intact. If the jump instruction is not intact, the defensive action taken is that mem [%r] is not correctly incremented.

Guards may be installed into host application software programs, such as those written in a high level programming language such as C, C++, Pascal, or Fortran, or those written in the assembly language of any computer hardware architecture known in the art, or those written in binary executable form or object code form. Because they are not restricted to high-level application software program syntax and control structures, instruction-level primitives allow assembly language code to be flexibly transformed to an appropriate state for self-protection. Assembly language code compiled from code written in one of the high-level software programming languages well known in the art, such as, for example, code written in C, C++, Pascal, or Fortran, or compiled Java bytecode, may be used as host application software program code. Assembly language code from other sources may be used as the host application software program code, provided the assembly language code is an assembly language code that does not base its computations on fixed absolute addresses. Generally, binary executable code or object code may be used as host application software program code provided the binary executable code or the object code does not base its computations on fixed absolute addresses. Nonetheless, if the binary executable code or the object code bases its computations on fixed absolute addresses, the binary executable code or the object code still may be used as host application software program code if the binary executable code or the object code is converted to a form in which the dependence on the use of fixed absolute addresses is eliminated. The vast majority of commercial software development results in assembly language code which can serve as host application software program code for the present invention.

In addition to the installation of guards, the present invention permits a set of messages of virtually any size to be embedded into the guarded host application software program as one or more contiguous or discontiguous data strings, which may be encrypted using encryption techniques known in the art, or disguised as programming instructions using encoding techniques known in the art. Such a message is known as a software "watermark" or "fingerprint." These watermarks or fingerprints often contain information about the vendor or the proper licensee of the application software program. It is desired that watermarks or fingerprints be tamper resistant, a characteristic known as "resilience." Watermark or fingerprint resilience may be enhanced by encryption of the watermark or fingerprint, or by disguising the watermark or fingerprint as host application software program instructions using well known encoding techniques. In addition to or instead of the aforementioned techniques, the present invention may preferably improve watermark or fingerprint resilience by hiding the watermarks or fingerprints in the code and protecting the watermarks or fingerprints by the same self-protection mechanisms that protect the application software program. Thus, attempts to alter a watermark such as, for example, altering the vendor or licensee information, will trigger the guard and may disable the use of the application software program. Such tamper-resistant watermarks or fingerprints are useful for tracing copyright violators who illegally alter or redistribute application software programs.

The present invention permits the user to specify parameters for customizing the guard installation process. One example of a guard installation customization parameter is the number of guards to be installed into a host application software program. The user may specify the number of guards to be installed. Alternatively, the user may permit the present invention to specify automatically the number of guards to be installed. For example, the present invention may specify automatically the number of guards to be installed by randomization, or may specify automatically the number of guards to be installed based on a measurement of the complexity of the host application software program using a software complexity metric known in the art. In another embodiment, the present invention may specify automatically the number of guards to be installed based on an analysis of the host application software program, its intended use, and/or its intended environment. For example, if the host application software program contains valuable trade secrets, if the host application software program is to be used to process classified information, if high reliability is required from the host application software program, and/or if the environment in which the host application software program is to be used is such that tampering is likely, the host application software program would be protected automatically with more guards than a host application software program which does not possess such features and/or is not exposed to such threats.

Another example of a guard installation customization parameter involves the use of a random number generator seed. The seed will drive a random number generator to produce a randomized sequence of numbers, which in turn will be used to achieve randomization across protection schemes or within the same protection scheme. The end result is that even if the same copies of an application software program are protected with the same self-protection scheme, their actual protections will be different, as if they were protected with different schemes. Randomization in application software program protection is particularly effective in thwarting attacks against a widely distributed application software program, such as a word processing application software program for use in a home or office environment. The random nature of the application software program protection precludes the same tampering method from being applied to differently protected copies of an application software program.

Another advantage of the method of the present invention is that the user may link external object files or library resources with the self-protecting application software program.

The output of the method of the present invention is a binary executable version of the host application software program, internally armed with at least one self-protecting guard and optionally embedded with guarded watermarks.

Figure 2:
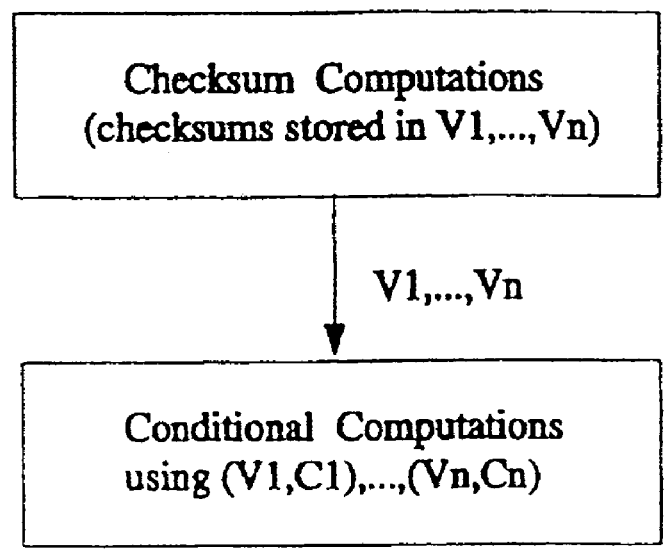
FIG. 2 shows the first and second computational component of a guard according to the present invention.

FIG. 2 shows the first and second computational component of one embodiment of a guard according to the present invention. Together, the first and second computational components are known as a "guard template." The guard template is converted into a guard during generation of the final binary executable file. The first computational component computes one or more checksums of the client code block(s). The second computational component performs "conditional computations" for the host during program execution in which the checksum of one or more client code blocks are compared to known or derived values. When the checksum matches the known or derived value, the guard permits normal host software computations to proceed. When the checksum differs from the known or derived value, the guard will "fire," resulting in possibly delayed defensive action from the host application software program.

The first computational component of a guard is based on a predefined checksumming template. The second computational component of a guard has no predefined structure. Its structure depends on the host application software program.

The first computational component of a guard is constructed from at least one predefined checksumming template that specifies checksum computations. There are many possible forms of such templates. In one embodiment of the present invention, the checksumming templates are provided for the user by the present invention, giving the user the ability to select a desired checksumming template(s) to use by name or other identifying characteristic. In another embodiment of the present invention, the user may develop customized checksumming templates for his own use without relying on the present invention to provide checksumming templates. Another embodiment of the present invention combines the features of these embodiments, providing the user with a set of checksumming templates which may be selected by name or other identifying characteristic, while also providing the user the ability to develop customized checksumming templates for his own use. FIG. 3 shows two examples of checksumming templates according to the present invention written in INTEL®-like assembly language code instructions.

The first checksumming template example illustrated in FIG. 3, template 1, describes a simple checksum computation, which produces a single checksum of its client code block. The second checksumming template example illustrated in FIG. 3, template 2, produces two checksums based on different operations. In each of template 1 and template 2, there are special parameters such as CHECKSUM_*, $START_*, and $END_* that denote checksum variables and the starting and ending segment addresses of the client code block, respectively. These parameters, as well as others, such as LABEL_* and TEMP_*, will be mapped to their corresponding host variables or values in the process of guard installation. Note that the checksumming templates also contain random-valued parameters $RANDOM_* which are randomly initialized during the guard installation. These random-valued parameters can be made to adjust the rigor of checksumming, even for simple checksumming schemes. For example, the smaller the initialized values of $RANDOM__2 in each of template 1 and template 2, the more sensitive the checksumming schemes in each.

It is preferable that the first computational component of a guard not be made too complicated, because simpler guards are more likely to remain undetected by a hacker in the host application software program than are complex guards. Furthermore, the strength of the host application software program protection preferably does not depend on a single guard at one location. Instead, it preferably depends on a distributed network of guards that collectively perform checksumming on the same or on different client code blocks. This technique is known as "distributed checksumming."

The number of different checksumming templates available to be used as the first computational component of a guard is not a critical factor. Code obfuscation transformations performed on the host application software program after guard installation will disguise the code, hindering detection of recurring guard code by a hacker.

Prior to installing a guard, the user may specify to the system that creates the tamper resistant software how many guards to deploy within the host application software program, which client code to protect, which of the plurality of available checksumming templates to use, and at which point(s) in the host application software program code the guard is to be installed. Such specification may be made through a user interface means known in the art such as, for example, a graphical user interface. In one embodiment of the present invention, these factors may be selected randomly and automatically by the system that creates the tamper resistant software. After these decisions are made, the first step in the guard installation process is installing each checksumming template into the host. Parameters in the checksumming template are mapped to host variables or values, and the resulting code then is inserted at the chosen installation point. Checksum parameters may be mapped to new global variables. Other parameters such as client addresses, code labels, and temporary variables may be mapped to corresponding addresses, new labels, and unused registers (or to new global variables if all registers are live at the insertion point) in the application software program, respectively.

Following the installation of each checksumming template, the next step in the guard installation process is generating the second computational component of the guard. The second computational component contains one or more expressions from the host application software program, which have been modified by the insertion of one or more conditional identity functions such that correct execution of the one or more host application software program expressions will depend upon the presence of one or more checksums computed by the first computational component of the guard which match predetermined values for, or derived from, the one or more checksums. First, at least one host application software program expression to be modified by the insertion of one or more conditional identity functions must be selected, optionally, by the user. An expression selected for modification must be at a location in the host application software program execution flow such that upon reaching the expression during execution, the one or more checksum variables to be used in the modified expression always will contain checksums computed by the first computational component of the guards which have not been modified by host application software program execution subsequent to their computation One or more "conditional identities" formed by the checksum variables and their corresponding constant values are inserted into each selected expression. Conditional identities are any expressions that, using the available checksum variables and corresponding constant values, conditionally compute "0" or "1," as required to maintain computational accuracy of the host application software program expression selected for modification. Conditional identities may be selected by the user, or preferably generated randomly and automatically by the system that creates the tamper resistant software. Each expression then is rewritten to incorporate the one or more conditional identity functions concealing the real checksum values. The rewriting will appear to transform the real checksum values to other different numbers. The corresponding constant values with which the checksum variables form conditional identities are generated during the patching step of the present invention explained hereinafter.

FIG. 4 shows an example of expression rewriting to incorporate conditional identities according to the present invention. In FIG. 4, expression (1) is transformed to expression (2) via a process of inserting into expression (1) mathematical identity elements (in this case '0's) in such a way that the result is not affected. The identity elements are then replaced in expression (3) by appropriate expressions formed by pairs of computed checksum values (u and w) and their corresponding constant values ($u_0$ and $w_0$) against which they will be verified. Expression (3) then is rearranged to hide the changes. The final result is expression (4), which is conditionally equivalent to expression (1).

The next step in the guard installation process is to mark those data values derived from the checksum values. All checksum values are unknown to the system at this stage because they will be computed during the patching step of the present invention (discussed hereinafter) from the contents of an output binary image that has not yet been created. Therefore, any data values derived from such unknown sources must be recomputed and rewritten to the code once they become known during the patching step of the present invention. At this stage, the system only marks the locations for all data values to be derived from unknown checksum values, and saves the sequences of operations that will derive the data values from the unknown checksums.

Figure 5:
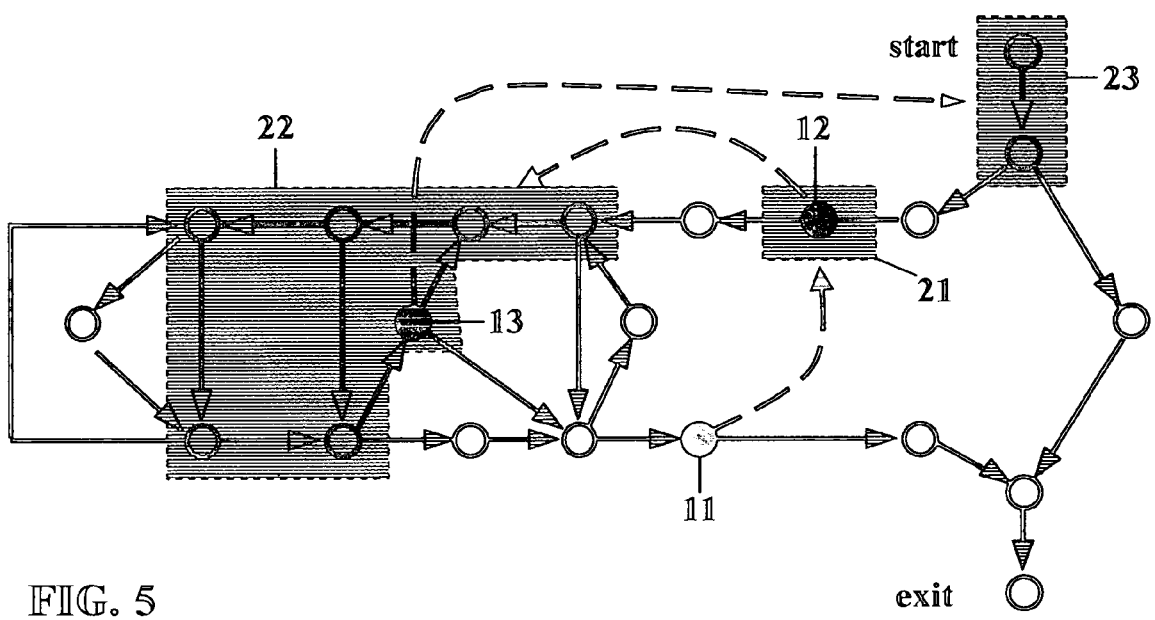
FIG. 5 shows a sample control flow graph ("CFG") of a host application software program protected by a distributed network of three guards according to the present invention.

Self-protection may be based on a distributed network of guards that protect the host application software program and each other in a cooperative manner. FIG. 5 shows a sample control flow graph ("CFG") of a host application software program protected by a distributed network of three guards according to the present invention. The three guards are shown in the darker circles, and labeled as guard 11, guard 12, and guard 13. Guard 11 is responsible for protecting its client code, shown as a shaded region and labeled as client code 21. Guard 12 is responsible for protecting its client code, shown as a shaded region and labeled as client code 22. Guard 13 is responsible for protecting its client code, shown as a shaded region and labeled as client code 23.

Self-protection is reinforced by having guards protect themselves. In FIG. 5, guard 11 protects client code 21, which contains guard 12. Also in FIG. 5, guard 12 protects client code 22, which contains guard 13. The three guards form a protection chain, making the task of modifying the host application software program more difficult. For example, to defeat guard 13 which protects the start of the application software program, guard 11 and guard 12 have to be defeated as well.

Because guards may be installed almost anywhere in the code, and because guards can protect each other in many ways, defeating a self-protecting software program could require a laborious effort of wholesale "code debugging"—an effort that may become greater than that of rewriting the host application software program from scratch. FIG. 6 shows an example of assembly language code which computes and prints the factorial of a positive integer. FIG. 7 shows the assembly language code of FIG. 6 with a guard installed according to the present invention at the site identified in FIG. 7 at line 39.

There are several additional advantages of a scheme employing protection by a distributed network of guards. Unlike the approach disclosed by Aucsmith in his article of using few security kernels to protect the host application software program, each security kernel requiring a large number of instructions for proper operation, distributed protection by a larger number of smaller guards requiring fewer instructions provides the following advantages: (a) checksumming client code block(s) by a distributed networks of guards may be simplified because the load is shared among the guards in the network; (b) a distributed networks of guards can be installed in a wide variety of logical formations to defend the client code block(s); and (c) due to the small size of the guards, each guard may be more easily concealed in the host application software program code to prevent discovery by a hacker.

A protection scheme employing a distributed network of guards relies on a balance between the level of protection it offers and the amount of additional degradation to host application software program performance the user will tolerate. Increasing the level of protection means more guards are used to protect more client code blocks. Each additional guard requires storage space and increases computational overhead on the host application software program. A heavily protected host application software program with a large number of guards may result in a substantial loss of computational speed. While the method of the present invention implements several protection schemes and could select one or more client code blocks at random to be protected, it is preferable that the user of the present invention specify which portions of the software program to protect and what level of protection is desired.

The client code blocks to be protected may be marked and labeled with the desired level of protection or specific protection scheme specified by the user. The user may do so, for example, through a graphical user interface that allows specific client code blocks to be designated, or by identifying the names of routines or basic blocks containing the client code blocks. Alternatively, at the option of the user, the client code blocks to be protected may be selected randomly and automatically. Other means of identifying the client code blocks known in the art may be utilized, such as identification of the client code blocks by name as an input parameter to a software program embodying the present invention. For high volume production of self-protecting software programs originating from the same software program source, such user information may only need be specified once and then replicated automatically.

Each portion of the code to be protected then is identified at the basic block level so that basic blocks are the smallest units of code to be protected. For additional security, the existing set of marked basic blocks may be extended to a larger set that contains all ancestor basic blocks of all paths of length "N" or less that precede each originally marked basic block. This is to ensure "code protection range" comprising the "neighborhood of radius N" of each sensitive basic block is protected as well. The neighborhood of radius N of each originally marked basic block is protected in the same way as the basic block, and if a newly marked basic block has overlapped protection, it is given correspondingly larger protection.

One example of a distributed network of guards according to the present invention is known as a directed-acyclic graph ("DAG"), where each node with an out-edge represents a guard and the node or nodes to which it points represent its client code. A DAG has no cycles, so guards do not protect each other in a circular manner. If cycles were allowed, the compromise of one of the guards in a cycle would make the compromise of all other guards in the same cycle easier, as a guard will contain information that would direct the attacker toward its client's location. Cycles also complicate the installation process.

Figure 8:
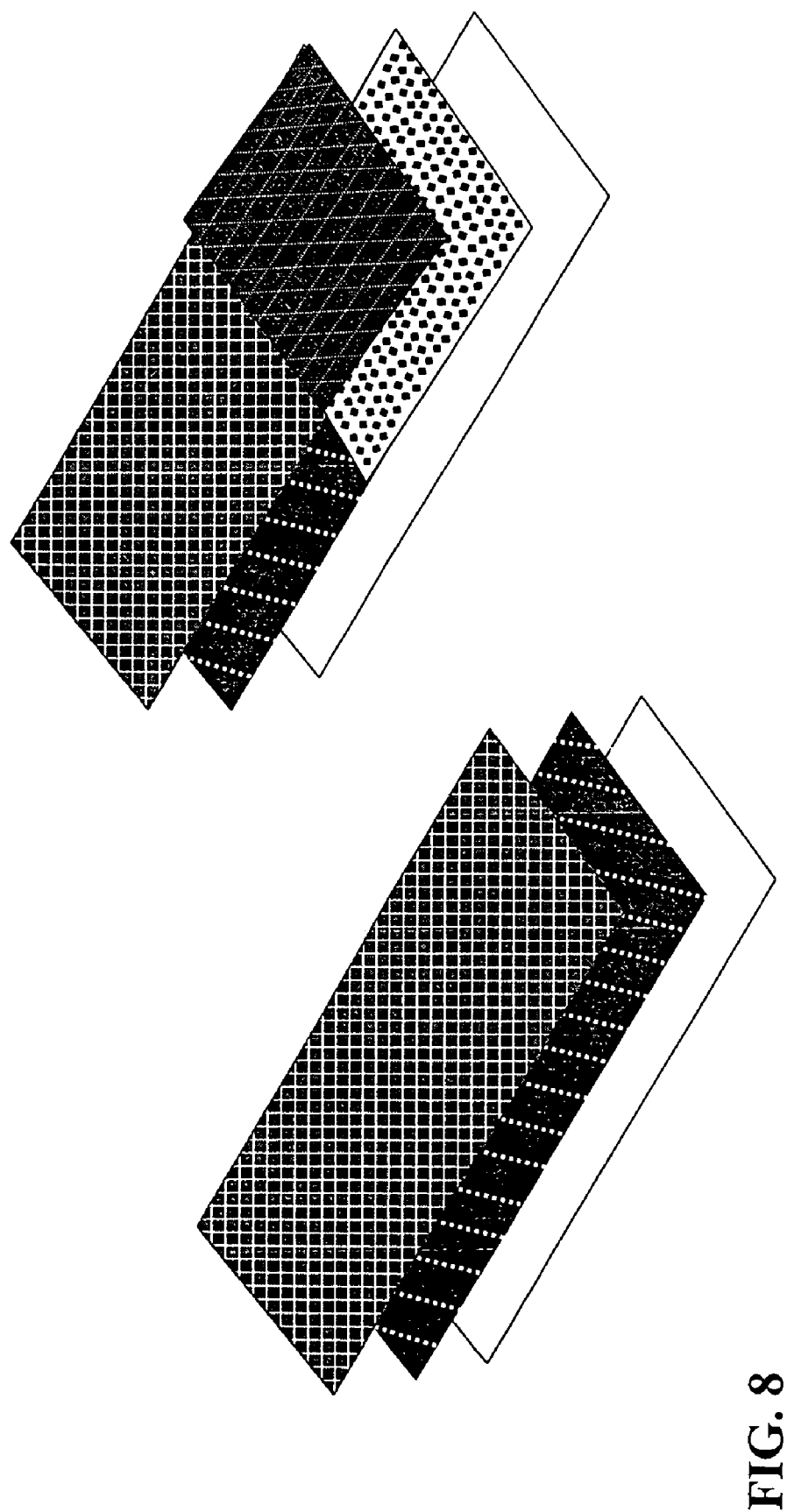
FIG. 8 shows graphically an example of two client code block protection schemes according to the present invention, wherein the same underlying client code block is protected by a first and a second protection layer of guards, each protection layer comprised of a different number of guards.

FIG. 8 shows graphically an example of two client code block protection schemes according to the present invention, wherein the same underlying client code block is protected by a first and a second protection layer of guards, each protection layer comprised of a different number of guards. Part (a) of FIG. 8 illustrates as the bottom layer a client code block protected by a first and a second protection layer of guards, each protection layer comprised of a single guard protecting the entire scope of the code block. Part (b) of FIG. 8 illustrates the same client code block protected by a first and a second protection layer of guards as in part (a), but each protection layer in part (b) is comprised of two different guards instead of a single guard. The different shades shown in part (a) and part (b) indicate the different guards using different checksumming functions. Each protection scheme illustrated in FIG. 8 has advantages and disadvantages. The scheme illustrated in part (a) provides less security but requires less code. The scheme illustrated in part (b) uses more guards, thereby adds more code to the host application software program, but enjoys a benefit of better security.

The present invention includes a flexible method for specifying the formations of the distributed networks of guards. Such a method allows the guard network formations to be specified coarsely or precisely, depending on the user's needs. For testing purposes or particular software programs, specifically defined guard network formations may be needed. For high volume production of self-protecting software programs, details of guard network formations may be left unspecified by the user in favor of randomized specification by the present invention in a manner that meets the levels of security, cost, and software program execution performance desired by the user.

Figure 9:
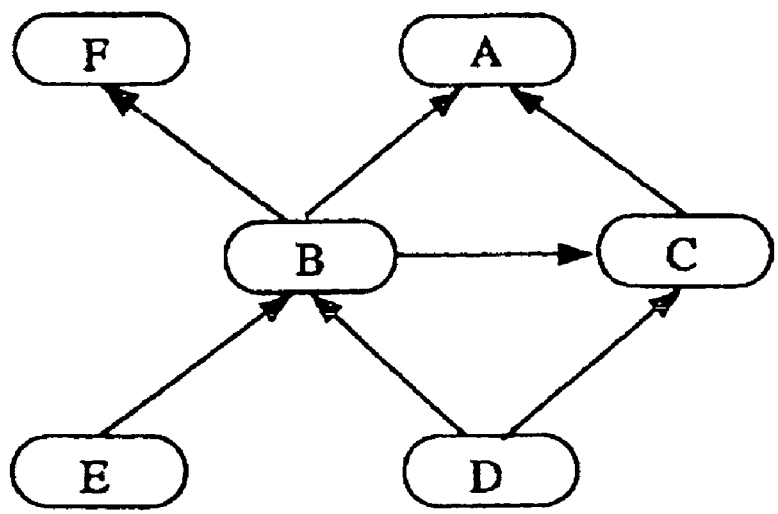
FIG. 9 shows a directed-acyclic graph according to the present invention.

FIG. 9 shows an example of a directed-acyclic graph according to the present invention, wherein the guard formation is a DAG whose nodes are either "brigade" nodes or "client group" nodes. A brigade node is a node with out-edges. A brigade node represents a group of guards that, collectively, protect a number of client code blocks. For example, nodes B, C, D, and E in FIG. 9 are four brigade nodes. A client group node is a node pointed to by a brigade node. A client group node represents a set of basic blocks protected by a brigade node. For example, in FIG. 9, A is a client group protected by both B and C, while A, C, and F are the client groups of B. Different client group nodes do not have basic blocks in common.

Each DAG formation has a set of client group nodes with no out-edges known as "roots," each of which denotes a disjoint set of host basic blocks protected by corresponding brigade nodes in the formation. For example, nodes A and F are the two roots of the formation in the FIG. 9.

This general guard formation scheme can be used for hiding low-level details of actual guard deployments which will be randomized within each brigade node, and for specifying precisely a particular network of guards when the number of guards in each brigade node is set to one. A software program can be protected by more than one guard formation.

For each host application software program, the user may specify to the system that creates the tamper resistant software a set of guard formation graphs, the set consisting of at least one guard formation graph of the same general form as that shown in FIG. 9. The set of guard formation graphs will contain general information about the guard protection scheme, but the details of what the guards are and how they protect the code may be left to the system that creates the tamper resistant software to implement. Alternatively, the set of guard formation graphs, or any graph in the set of guard formation graphs, may be generated automatically by the system that creates the tamper resistant software based on a first and a second guard formation graph customization parameter to be supplied by the user. The first guard formation graph customization parameter is the number of brigade nodes protecting a root. The first guard formation graph customization parameter specifies the minimum level of protection assigned to each root node. The second guard formation graph customization parameter is the number of additional brigade nodes to be added to the formation. The second guard formation graph customization parameter may achieve a better and randomized final protection scheme. After the first guard formation graph customization parameter is applied, the beginning formation will be initialized with the roots being protected by the given number of brigade nodes. Application of the second guard formation graph customization parameter results in more brigade nodes being added to the formation in a way that each new brigade node protects a random subset of the nodes in the existing guard formation graph.

Each brigade node in every guard formation graph specified for a host application software program is installed in an order in which its installation is complete before it becomes protected by another brigade node. To install each brigade node associated with its set of client group nodes, the following is done:

(1) Divide each client group node of basic blocks that has not previously been divided into subgroups of basic blocks, into subgroups and then for each subgroup form a contiguous code block using its basic blocks arranged in a randomized order. This contiguous code block is ready to be protected by guards. Dividing a client group node into subgroups of basic blocks allows protected client code to be distributed in the final host application software program listing.

(2) Assign guards to protect each contiguous code block. This involves selecting a checksumming template for each guard, and selecting a portion of code within the contiguous code block to be its client code. The entire contiguous code block may, optionally, be selected as the client code.

(3) Install each guard into a basic block that is not protected by a previously installed guard. This prevents the guards from forming a logical protection cycle. The installation site of each guard may be selected either randomly, or by the user who specifies the location at which the guard is to be installed, or through analysis of an execution profile of the original host application software program, for example, in order to avoid frequently executed regions of the host application software program code where the presence of the guard code may have a larger negative effect on software program execution performance.

A software program protection scheme relying entirely on one guard or on a distributed network of guards is vulnerable to a collusion attack, in which two or more similarly protected copies of the host application software program are compared instruction-by-instruction. Any differences in the code will signal possible presence of a guard. To thwart such attacks, the host application software program code may be obfuscated.

The technique of code obfuscation is a transformation that, given a valid software program, rearranges or otherwise modifies the software program to produce another valid and functionally equivalent software program that is difficult to understand and analyze. Simple obfuscating transformations such as register reallocation and reshuffling of instructions and/or basic blocks have limited effectiveness. These transformations tend to produce local changes to the code, while leaving the global control flow patterns almost intact. Local changes which maintain the same global control flow patterns make code deobfuscation, the reverse transformation of code obfuscation, and similar analyses of the code almost as easy as before obfuscation. Effective code obfuscation therefore requires more aggressive transformations for rendering the code unintelligible.

The CFG of a software program is a static representation of all possible execution flows of the software program that may occur during program execution. A statically known and structured CFG usually leads to a more accurate analysis and thus a better understanding of the software program. For example, as discussed by Cifuentes in an article entitled, "Structuring Decompiled Graphs," published in *Proceedings of the International Conference on Compiler Construction*, pages 91-105, Linkoping, Sweden, 1996, a structured assembly language software program produced from a source code written in a high-level software programming language such as C, can be decompiled back to a corresponding C language software program, permitting better interpretation of the code. In cases where decompilation is impossible, aggressive automated software program analysis based on the statically known CFG still is possible using methods discussed by Larus in an article entitled, "Whole Program Paths," published in *SIGPLAN PLDI*, May 1999; and by Larus et al. in an article entitled, "EEL: Machine-Independent Executable Editing," published in *SIGPLAN PLDI*, June 1995. To frustrate software program analysis and understanding, the CFG must be unstructured and made statically unintelligible.

In addition to a well structured and obvious control flow, assembly language code produced by compilers for high-level software programming languages possesses two other disadvantages. The first disadvantage arises from the fact that such assembly language code produced by such compilers is very likely to contain many code segments of certain idiomatic patterns which may provide hints to understanding the CFG. For example, the GNU GCC compiler produces the same segments of code for enclosing each function body:

```
// entry
push1    %ebp              // save old stack frame pointer
mov1     %esp, %ebp        // allocate new frame
sub1     <const>, %esp     // allocate local variables
...
//exit
leave                      // deallocate local vars & frame
ret                        // return to caller
```

Similarly, each function call site is coded in another familiar code pattern:

```
// call site of f
push1    <value1>          // push arg1 into stack
...
push1    <valueN>          // push argN into stack
call     f                 // call the function
add1     <4xN>, %esp       // restore stack after call
```

These patterns expose the functionality of the software program, allowing a hacker to dissect the code one subroutine at a time.

The second disadvantage of such assembly language code arises from the fact that assembly language code compiled from high-level source code usually has fixed notation for stack variables, for example, base register plus offset. This notation to some degree preserves the integrity of corresponding variables in the high-level source code. For example, the assembly language code segment below identifies the uses and/or definitions of its variables:

```
// b = a * (a + b)
mov1 -4(%ebp), %eax // %eax := a
```

```
add1 -8(%ebp), %eax // %eax := %eax + b
imu1 -4(%ebp), %eax // %eax := %eax * a
mov1 %eax, -8(%ebp) // b := %eax
```

A first, a second, and a third new assembly language software code obfuscating technique are disclosed herein. The first new obfuscation technique is known as "CFG-merging." The second new obfuscating technique is known as "CFG-cloning." The third new obfuscating technique is known as "data-aliasing." The new obfuscating techniques will produce unintelligible code and facilitate self-protection by: (a) reducing idiomatic code patterns in the code through the use of CFG-merging; (b) destroying modularity of subroutines through the use of CFG-merging; (c) creating new, nondeterministic control flows through the use of CFG-cloning; (d) blurring variable boundaries through the use of data-aliasing; (e) concealing constant data values in the assembly language code through the use of data-aliasing; and (f) as a result of the foregoing techniques, building a network of inter-dependent data values throughout the code, thereby allowing guards to fire due to corruption in any part of the network, the consequent defensive action inducing errors that are more likely to be global and subtle.

Figure 10:
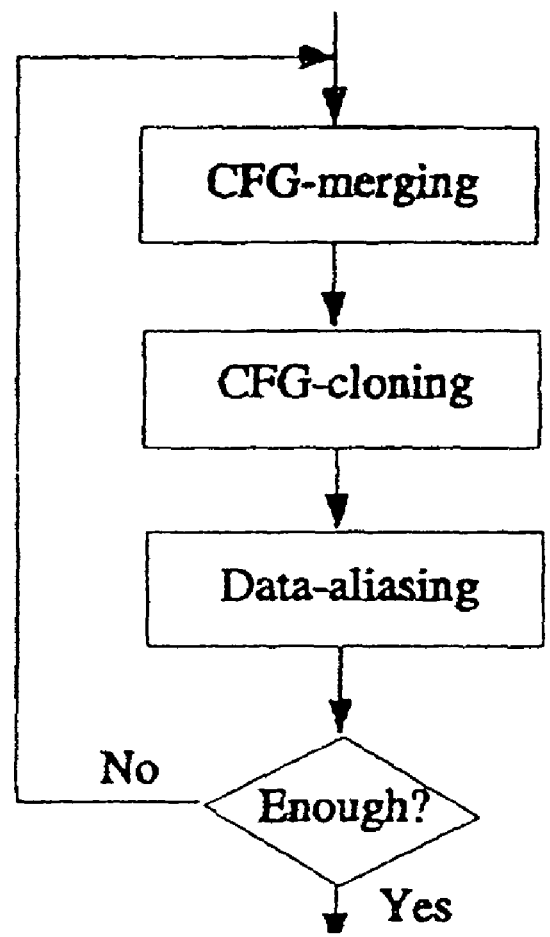
FIG. 10 shows a flowchart illustrating an embodiment of the assembly language code obfuscation process according to the present invention.

The first, second, and third new obfuscating technique may be used individually. Alternatively, any two of the three new obfuscating techniques may be used in combination. An additional alternative may be the use of all three new obfuscating techniques in combination. Repetitive use of the new obfuscating techniques on the host application software program assembly language code may enhance the level of obfuscation achieved. One embodiment of the code obfuscation process of the present invention is comprised of a continuous application of the three techniques on the code for a certain number of cycles. FIG. 10 shows a flowchart illustrating this embodiment of the code obfuscation process according to the present invention.

Techniques of code obfuscation applicable to high-level programming languages such as Java and C are known in the art. According to Mambo et al., techniques of code obfuscation in assembly language code remain scarce. The present invention includes three simple yet effective code obfuscation techniques for assembly language software programs.

Generally, binary executable code or object code may be used as host application software program code provided the binary executable code or the object code does not base its computations on fixed absolute addresses. Nonetheless, if the binary executable code or the object code bases its computations on fixed absolute addresses, the binary executable code or the object code still may be used as host application software program code if the binary executable code or the object code is converted to a form in which the dependence on the use of fixed absolute addresses is eliminated.

Figure 11:
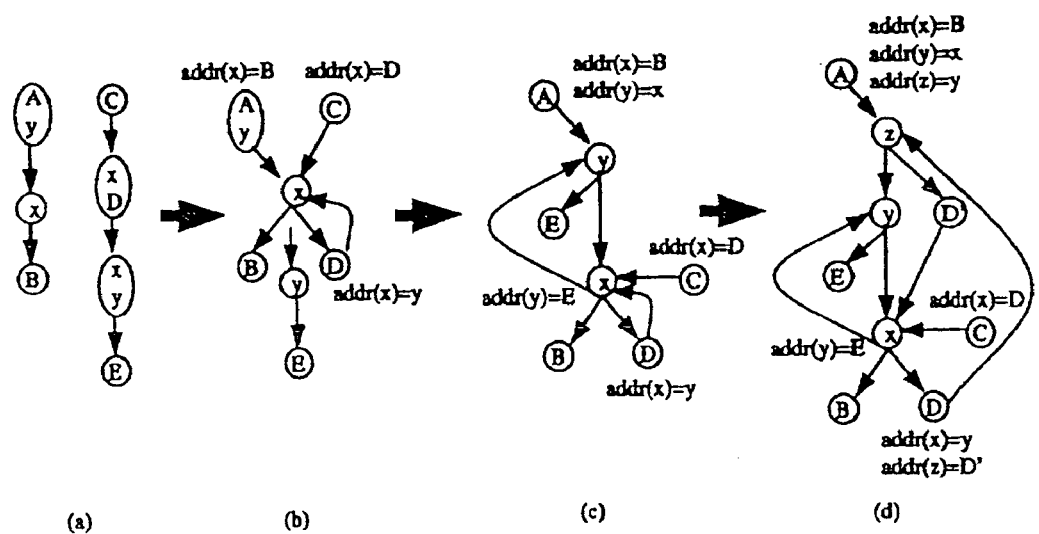
FIG. 11 shows the merging process of two unrelated flows in a simple CFG according to the present invention.

The first assembly language software code obfuscation technique is known as CFG-merging. CFG-merging involves changes to the original CFG which force unrelated control flows to converge, thereby creating merge points at which different data values mix together. FIG. 11 shows the merging process of two unrelated flows in a simple CFG according to the CFG-merging assembly language software code obfuscating technique of the present invention. From part (a) to part (c) of FIG. 11, merging occurs among the x's and y's, respectively. In part (d) of FIG. 11, merging occurs between the edge from nodes A to y and an internal edge in node D. Preassignments of jump target addresses in the merged nodes are illustrated. The resulting CFG is very different from the original.

Figure 12:
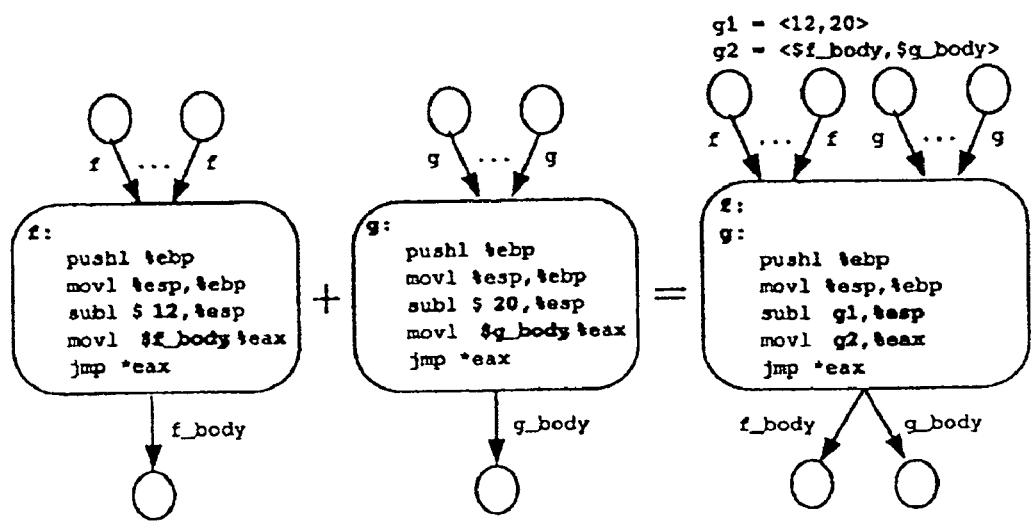
FIG. 12 shows two basic blocks being merged according to the present invention.

CFG-merging works by combining similar intra-block code segments of the assembly language software program together. Different code segments are considered "similar" if they are empty code segments that contain no program instructions, or if they are code segments that have the same program instructions with same variables in the same order. The variables may have the same or different immediate values at corresponding positions. FIG. 12 illustrates two basic blocks being merged according to the CFG-merging assembly language software code obfuscating technique of the present invention, wherein the conflicting set of immediate values is replaced by a variable initialized to hold the values in the different paths that lead to the same basic block. A set or vector of corresponding immediate values, one from each segment, are said to be in "conflict" if at least one pair of the values are different.

The CFG-merging assembly language software code obfuscating technique of the present invention consists of a first and a second phase of code merging. In the first phase of code merging, similar idiomatic code segments produced by typical compilers are merged. In the second phase of code merging, similar segments of the code resulting from the first phase of code merging are merged in a randomized manner.

After multiple iterations of the first and second phase of code merging, the resulting code and CFG look very different from the original. For example, FIG. 13 shows the sample application software program code from FIG. 7 after two code blocks from FIG. 7 have been merged. The two code blocks to be merged are the code blocks comprising the first four instructions in basic block "main," shown in FIG. 7 as lines 2 through 5, and the first four instructions in basic block "pr_fact," shown in FIG. 7 as lines 34 through 37. The first step in transforming the sample application software program code from FIG. 7 to the merged application software program code in FIG. 13, is to make the candidate code blocks to be merged form individual basic blocks by themselves. The basic block "main" is divided into two basic blocks, "main_1" and "main_2." The basic block "main_1" will contain the first four instructions originally contained in basic block "main," and a new, fifth instruction directing the control flow of the application software program to the next basic block to be executed. The basic block "main_2" will contain the remaining instructions from basic block "main."

Similarly, the basic block "pr_fact" is divided into two basic blocks, "pr_fact and "pr_fact_1." The basic block "pr_fact" will contain the first four instructions originally contained in basic block "pr_fact," and a new, fifth instruction directing the control flow of the application software program to the next basic block to be executed. The basic block "pr_fact_1" will contain the remaining instructions from basic block "pr_fact."

Because each candidate code block to be merged must have at least one predecessor basic block, a new basic block "main" containing only a trivial jump instruction is created and inserted in front of basic block "main_1." Having a predecessor basic block before a merged basic block ensures that data values needed in the merged basic block can be precomputed by the data precomputation methods discussed hereinafter before the final binary executable version of the merged block is created. The following shows the results of this step:

```
main:
    jmp main_1
main_1:                                  // a block to be merged
    leal -4(%esp), %esp
    movl %ebp, (%esp)
    movl %esp, %ebp
    subl $8, %esp
    jmp main_2                           // end of the block
main_2:
    leal -8(%ebp), %eax
    leal -4(%esp), %esp
    movl %eax, (%esp)
    leal -4(%esp), %esp
    movl $str1, (%esp)
    leal -4(%esp), %esp
    movl $next1, (%esp)
    jmp scanf
...
pr_fact:                                 // a block to be merged
    leal -4(%esp), %esp
    movl %ebp, (%esp)
    movl %esp, %ebp
    subl $4, %esp
    jmp pr_fact_1                        // end of the block
pr_fact_1:
    // guard installation site
    movl $100, g1
    movl $next1, %eax
...
```

In the next step, the basic blocks "main_1" and "pr_fact" are merged, forming a new basic block with the two labels: "main_1" and "pr_fact." The merged basic block initially will contain two sets of conflicting constants, which must be resolved for proper execution of the application software program. The fourth instruction of the basic block "main_1" uses the constant value "8," while the fourth instruction of the basic block "pr_fact" uses the constant value "4." The fifth instruction of the basic block "main_1" uses the constant value "main_2," while the fifth instruction of the basic block "pr_fact" uses the constant value "pr_fact_1." The conflicts are eliminated by replacing the values "8" and the "4" in the fourth instruction of the merged basic block with the new global variable "g2," and by replacing the values "main_2" and "pr_fact_1" in the fifth instruction of the merged basic block with the new global variable "g3."

These new global variables must be initialized by the process of data precomputation so they will contain the appropriate value at time of use. In this example, the notation "g2=<8,4>" denotes that variable "g2" must contain the value "8" when the execution flow comes from a predecessor of the original basic block "main_1," and that it must contain the value "4" when the execution flow comes from a predecessor of the original basic block "pr_fact". Similarly, the notation "g3=<main_2, pr_fact_1>" denotes that variable "g3" must contain the value "main_2" when the execution flow comes from a predecessor of the original basic block "main_1," and that it must contain the value "pr_fact_1" when the execution flow comes from a predecessor of the original basic block "pr_fact." The following shows the results of this interim step:

```
main:
    jmp main_1
main_1:                                  // the merged block
pr_fact:
    leal -4(%esp), %esp
    movl %ebp, (%esp)
    movl %esp, %ebp
```

-continued

```
    subl g2, %esp
    jmp *g3                        // end of the block
    // g2=<8,4>, g3=<main_2, pr_fact_1>
main_2:
    leal -8(%ebp), %eax
    leal -4(%esp), %esp
    movl %eax, (%esp)
    leal -4(%esp), %esp
    movl $str1, (%esp)
    leal -4(%esp), %esp
    movl $next1, (%esp)
    jmp scanf
    . . .
```

The next step is to initialize the new global variables by performing data precomputation. The application software program code in FIG. 13 shows an example of the finished result of the data-precomputations of global variables "g2" and "g3" according to the method of data precomputation discussed hereinafter. As shown in the newly merged basic block in FIG. 13, an instruction has been modified, and additional instructions have been added to the code so that the global variables "g2" and "g3" will contain the proper values at time of use, and so that the program execution control flow will proceed correctly. Specifically, the instructions shown in FIG. 13 on lines 11, 13, 14, and 17, have been added to the code. The "jmp" instruction shown in FIG. 13 on line 18 has been modified.

FIG. 14 shows the resulting code after last three instructions of each of the three basic blocks "next1," "main_2," and ".L98" in FIG. 13 have been merged together. The newly merged basic block is shown in FIG. 14 as the basic labeled by "next1_1," "main_2_1," and ".L98_1." The process of merging these three basic blocks generally is the same as that discussed above. Specifically, each set of instructions to be merged is split from its parent basic block into a new basic block. The new basic blocks are merged together. The conflicting constants are replaced by new global variables (in this case, g1 and g4). Finally, the new global variables are initialized by the process of data precomputation.

After each phase of code merging, multiple distinct control flows become coalesced at a new fusion point where the different data flows mix together. The resulting CFG usually will be a strange-looking graph within which the original execution flows are hidden. The code becomes more obfuscated through additional iterations of the CFG-merging technique. If the code was compiled from a high-level source code, it will be difficult for it to be decompiled back to the source code after merging the code in this manner.

Figure 15:
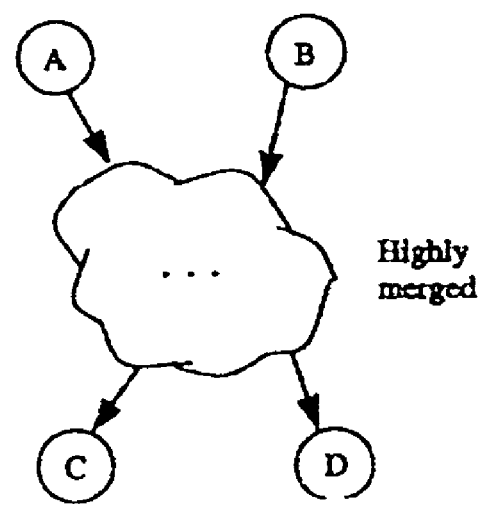
FIG. 15 shows graphically an example of a CFG with its central portion obfuscated as a result of intensive merging according to the present invention.

FIG. 15 shows graphically an example of a CFG with its central portion obfuscated as a result of intensive merging according to the present invention between the two control flows that go from A to D and from B to C, respectively. To a hacker, it is not apparent that the execution flows from A to D. However, the present invention requires that such flow information from the original CFG be preserved and known, despite the many rounds of merging that may have drastically changed the graph. If such flow information is not preserved, the cost of analyzing and obfuscating the code may grow at an exponential rate.

Figure 16:
FIG. 16 shows graphically an example of a single link-node contained in a basic block of an original CFG according to the present invention.

The present invention uses a simple data structure known as a "link-node" to preserve the integrity of the original CFG through the code-obfuscation process. A link-node represents the in-flow and out-flow information of a basic block in the original CFG of a host application software program before CFG-merging. FIG. 16 shows graphically an example of a single link-node contained in a basic block of an original CFG according to the present invention. The link-node maintains the in-flow and out-flow information of the basic block.

Figure 17:
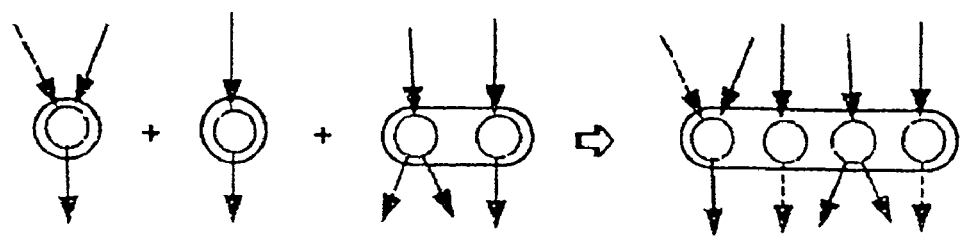
FIG. 17 shows graphically an example of the process of preserving link-nodes in the new basic block created from CFG merging according to the present invention.

As multiple basic blocks are merged into one new basic block, the link-nodes within the old basic blocks are moved to and preserved within the new basic block. FIG. 17 shows graphically an example of the process of preserving link-nodes in the new basic block created from CFG-merging according to the present invention. Thus, while the CFG changes, its underlying link-node graph ("LNG") maintains the flow behavior of the original CFG. Throughout the process of code obfuscation, it is the LNG that is being used for supporting data analyses. Note that a link-node is contained in exactly one basic block at all times.

In the context of basic blocks, a basic block "predecessor" of basic block b is defined as a basic block that has an out-edge pointing to b. Similarly, in the context of link-nodes, a link-node "predecessor" of node n is defined as a link-node that has an out-edge pointing to n. "Pred-links(x)" is defined as the set of link-node predecessors of link-node x. "Succ-links(x)" is defined as the set of link-node successors of link-node x.

The following procedure may be used to merge multiple similar code segments together:
1. If a code segment to be merged is not an entire independent basic block, make it form an entire independent basic block by splitting it from its parent basic block.
2. If a basic block to be merged has no basic block predecessor, for example, if the basic block is the starting basic block of the host application software program, add an empty basic block as its predecessor.
3. Among the candidate basic blocks to be merged, select those that satisfy the following two conditions:
   (a) Basic blocks that do not contain any link-nodes that share a link-node predecessor;
   (b) Basic blocks that do not contain any link-node that is a predecessor of itself or of another link-node in either candidate basic block;
   These two conditions make later steps of the merging possible by guaranteeing that each distinct link-node in the merged basic block will have a unique, prior computation environment for deriving its needed values such as the target addresses for the jump instruction.
4. Merge the basic blocks into one, collecting and preserving their link-nodes in the merged basic block.
5. Assign a variable for each conflicting set of immediate values. The chosen variable may be either a new or a used variable that is not live in either the link-nodes of the merged basic block or in their link-node predecessors.
6. Precompute for each of the assigned variables its set of conflicting values.
7. If any of the basic blocks just merged previously were designated with levels or schemes of protection by guards, designate the merged basic block to be protected by the highest level or scheme of protection. This improves the likelihood that the merging process will not compromise the levels of protection expected by any of the old basic blocks.

Figure 18:
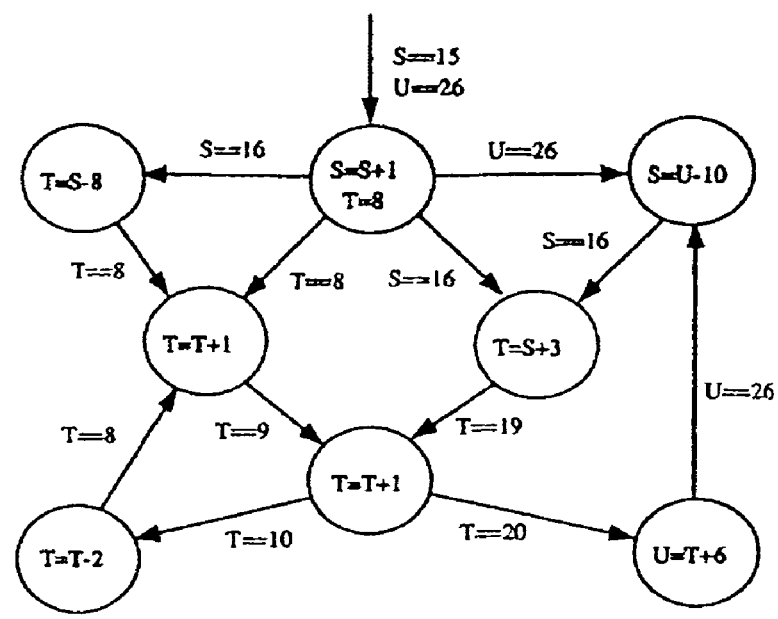
FIG. 18 shows a network of dynamically changing and mutually dependent data values resulting from the data pre-computation method of the present invention.

Driving the CFG-merging assembly language software code obfuscating technique, and the data-aliasing assembly language software code obfuscating technique, is a technique known as "data precomputation." Data precomputation comprises a method of hiding data values in variables and pre-computing their values before their use. A result of data precomputation is the establishment of a network of dynamically changing and mutually dependent data values that is tightly integrated into the host application software program assembly language code. FIG. 18 shows an example of such a network. Note that correct execution of the software program depends on the values of a variable. If a guard fires during execution altering the value of at least one variable, the error may propagate into other parts of the network and the software program potentially may suffer from a subtle error that is difficult for a hacker to detect.

Data precomputation is a general method for precomputing for a variable its set of values to be used at different points during the host application software program execution, so that upon reaching any point during the host application software program execution where the variable is to be used, the variable will contain an appropriate value. One use of data precomputation is to compute multiple sets of conflicting values within a newly merged basic block.

FIG. 19 shows an algorithm for performing data precomputation according to the present invention. The algorithm illustrated in FIG. 19 performs the data precomputation process in a reverse manner by initiating the process from the target basic block and then propagating the process in reverse directions of control flows. An advantage of this type of algorithm is that it works systematically with a CFG of any form, and that its backward propagation is flexible enough to stop at almost any desired point in the CFG.

The algorithm illustrated in FIG. 19 begins by setting the expected values of the target variable for the link-nodes in the target basic block. Each link-node expects a single value from the variable. The rest of the process involves "pushing away" the computations of these values to other parts of the CFG through the underlying network of link-nodes.

At each link-node where a variable is expected to hold a certain value, one of the following may be used to give the variable its expected value:

1. Do nothing and pass the same request to all link-node predecessors of the current link-node; or
2. Assign the variable its expected value by installing a corresponding computation in the parent basic block (if such a computation has not yet been installed), that initializes the variable with the value. If the computation uses an uninitialized variable, the variable will undergo the same process by requesting the predecessors to initialize it with the expected value.

Figure 20:
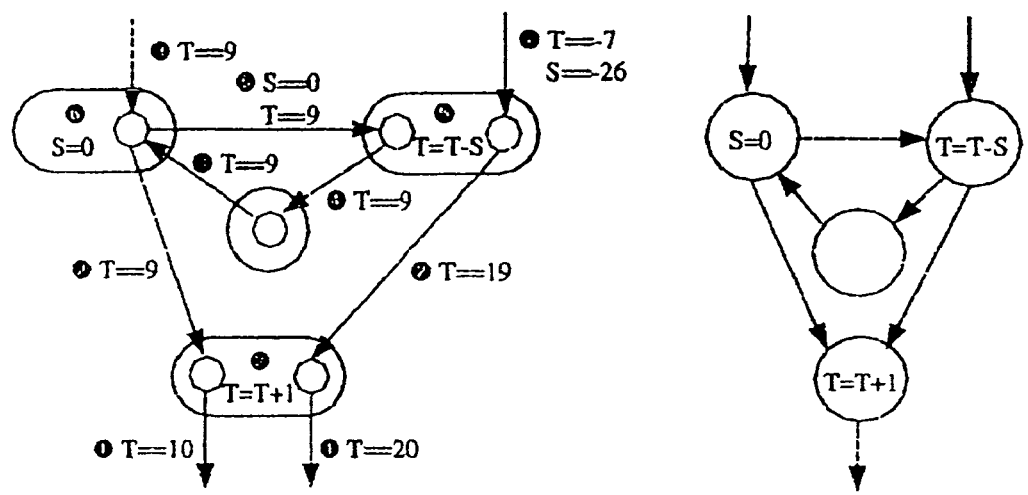
FIG. 20 shows an example of data precomputation based on an underlying graph of link-nodes according to the present invention.

FIG. 20 shows an example of data precomputation based on an underlying graph of link-nodes according to the present invention. Part (a) of FIG. 20 illustrates the process of backward propagation, starting from the bottom node. Part (b) of FIG. 20 shows what a user may see given only this portion of the CFG.

A result of data precomputation is the creation of a global network of inter-dependent data values stored as variables upon which the software program host depends. The network of inter-dependent data values is sensitive to changes in the data values because a change in one part of the network may trigger changes in other parts. This enhances the effectiveness of guards, where guards can fire at one part of the network and affect the whole network. As a result, the attacker may see only a consequence of guard firing without knowing where the guard firing actually occurs. This effect is known as the "subtle errors effect."

Figure 21:
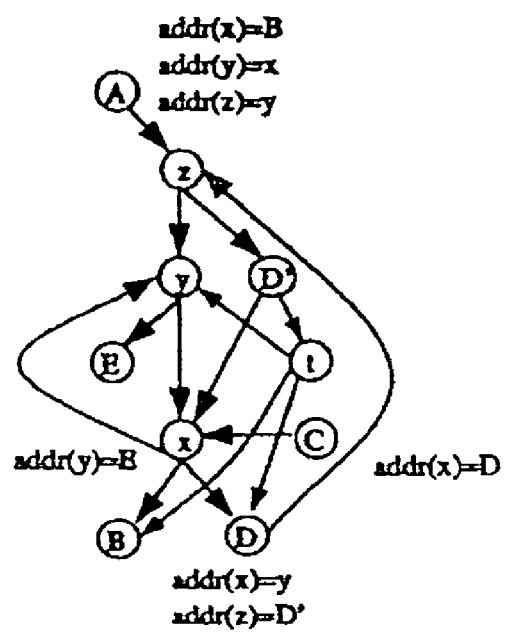
FIG. 21 shows an example of the CFG-cloning assembly language code obfuscating technique according to the present invention, wherein basic block t has been cloned from basic block x in FIG. 11, so that the flow coming from D' can go through either of x or t in a randomized manner.

The second assembly language software code obfuscating technique is known as CFG-cloning. CFG-cloning complicates the CFG by adding to it new, seemingly non-deterministic flows. FIG. 21 shows an example of CFG-cloning according to the present invention, wherein basic block t has been cloned from basic block x in FIG. 11, so that the flow coming from D' can go through either of x or t in a randomized manner.

CFG-cloning serves as a complement to CFG-merging by introducing into the CFG new flows cloned from parts of the graph. The intent of CFG-cloning is to complicate the underlying execution flows of the merged CFG by making the new flows that are partial and randomized substitutions of their parent flows, injecting "non-deterministism" in execution traces.

Basic blocks are the units to be cloned. The following is a method for CFG-cloning:

1. Selecting a small subset of basic blocks, each of which has a large number of unmerged basic block predecessors with only a single link-node successor.
2. Produce a clone for each of the above-mentioned basic blocks.
3. For each newly created clone, direct a subset of its unmerged basic block predecessors to also point to it as their new successor. Each of these predecessors may be modified in such a way that it will jump to either of its successors based on a randomized condition. As an example, one simple way to create a randomized condition is to do a comparison between two variables chosen randomly from the code. Outcomes, as a result, are based randomly on run-time values of the variables. A host application software program with such randomized conditions will be more difficult to understand. FIG. 22 shows an example of assembly language code containing a randomized jump-based decision which will be made by the host application software program during program execution based on the value of two unrelated variables, % eax and (% esp).
4. In the final step, all clones undergo basic block rewriting, such as the instruction reshuffling and register reallocation techniques used by Mambo et al. Basic block rewriting recasts the basic blocks with new looks, thereby offering a plausible appearance that they are functionally different from their counterparts. The functionality of the basic blocks remains unchanged. These clones may be further rewritten by other obfuscating transformations, such as CFG-merging, in later rounds of the code-obfuscating process.

The third assembly language software code obfuscating technique is known as data-aliasing. Data-aliasing involves hiding data values. In one embodiment, data-aliasing can involve hiding a constant data value, such as a numeric literal, in the code. Data-aliasing according to this embodiment involves the steps of identifying a constant data value to be hidden, identifying a variable, substituting an occurrence of the variable for at least one occurrence of the constant data value in the application software code, and initializing the variable by the process of data precomputation so that the variable will evaluate to the constant data value when the variable is needed during program execution. The steps can be repeated until a desired level of data-aliasing is achieved.

Figure 23:
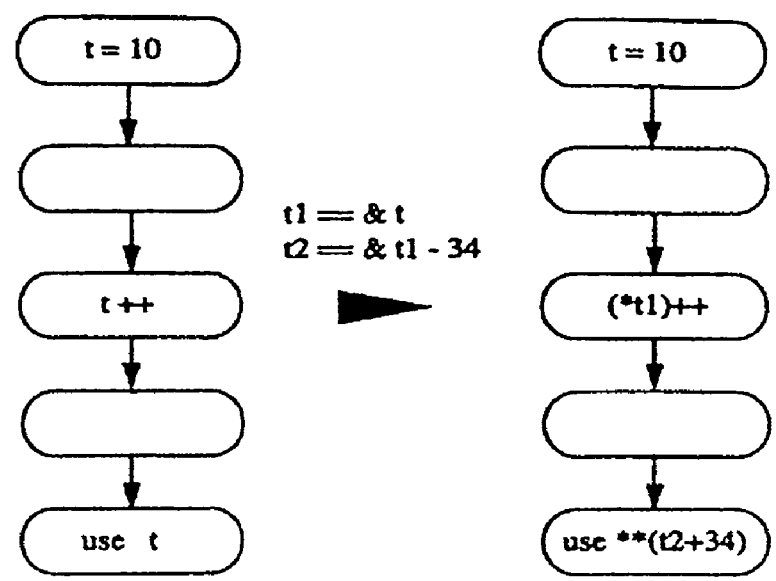
FIG. 23 shows an example of data-aliasing according to the present invention, wherein the two occurrences of variable t are aliased by variables $t_1$ and $t_2$, which are pointers containing the partial address of t.

In another embodiment, data-aliasing can involve creating pointer-aliases with arbitrary levels of indirection. FIG. 23 shows an example of data-aliasing according to this embodiment, wherein the two occurrences of variable t are aliased by variables $t_1$ and $t_2$, which are pointers containing the partial address of t. Variables $t_1$ and $t_2$ contain known precomputed values, and are used for accessing t indirectly through pointer arithmetic and dereferencing. Syntax similar to that used in the C software programming language is used in FIG. 23.

Data-aliasing is an application of a data-precomputation algorithm to hide data values in the code. Based on the network of variables with pre-computed values established by CFG-merging, data-aliasing can conceal as many data values in the code as desired, thereby further weaving the network of inter-dependent values into the host. For example, it can create pointer-aliases of arbitrary levels of indirection, by one of the following methods:

1. If t is a variable whose address, T, is a constant, for example, if t is a global variable, then an occurrence of t in the code can be replaced by a mathematical expression which evaluates to T, and which is dereferenced. For example, if $g_2$ is a new global variable initialized to hold the mathematical expression (T). Optionally, $g_2$ may be initialized to hold the value of a mathematical expression comprising T and at least one numeric literal, such as (T−4340480), or a mathematical expression comprising T and at least one variable, such as (T−x), or a mathematical expression comprising T, at least one numeric literal, and at least one variable. Where $g_2$ has been initialized to hold T, an occurrence of t in the code can be replaced by a second mathematical expression, which incorporates $g_2$, which evaluates to T, and which is dereferenced, such as, for example, *($g_2$), where "*" denotes pointer-dereferencing. If $g_2$ has been initialized to hold a mathematical expression comprising T and at least one numeric literal, such as (T−4340480), then the second mathematical expression substituted for t in this example would be *(4340480+g2). The second mathematical expression optionally may include additional numeric literals and/or at least one additional variable, provided the mathematical expression always evaluates to T. The constant address of $g_2$, $G_2$, can in turn be hidden by using another global variable with a known precomputed value, $g_1$. If $g_1$ holds, for example, 12345, then the occurrence of $g_2$ in *(4340480+$g_2$) may be replaced by *($g_1$−K) where K is the sum (−$G_2$+12345). The final representation for t then becomes *(4340480+*($g_1$−K)).
2. If t is a stack variable whose address is based on an unknown stack pointer and a known constant offset, then the constant offset can be obfuscated in a similar manner to the above.

The core data precomputation algorithm for data-aliasing is the same as that used in CFG-merging, except that in the data-aliasing technique the algorithm takes in only a single data value to be precomputed instead of a vector of them. The technique of data-aliasing involves randomly and repetitively selecting a subset of data values in the code and then performing data precomputation for each of them.

Software watermarks or fingerprints are messages encoded into software programs, which often carry information identifying the licensee or the vendor of the software program. A tamper-resistant watermark or fingerprint makes software program piracy less likely, since the watermark or fingerprint can be used to prove ownership of a software program copy, as well as to trace the origin of illegal redistribution of a software program. In addition to tamper-resistance, salient features of software watermarks include sufficient data capacity for encoding messages, ease of extraction by software program vendors or authors, and a high degree of confidentiality for sensitive messages.

With SPC, all of the foregoing salient features of software watermarking become easily attainable. To become tamper-resistant, watermarks are inserted into inter-basic block regions of the host application software program that have been protected by guards. Unlike dynamic watermarking schemes disclosed by Collberg et al. in an article entitled, "Software Watermarking: Models and Dynamic Embeddings," published in *ACM SIGPLAN-SIGACT POPL'99*, San Antonio, Tex., USA, January 1999, in which watermarks are encoded in run-time data structures and where data capacity becomes an issue, the watermarking or fingerprinting scheme of the present invention is static in nature and, theoretically, is unlimited in data capacity. In practice, however, longer watermarks may slightly degrade software program performance. Furthermore, as with any static watermarking scheme, extraction of watermarks is easily accomplished by scanning the file for known messages or patterns.

Figure 24:
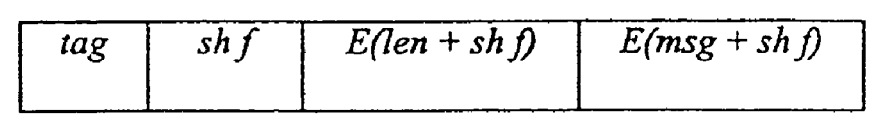

If confidentiality is necessary, watermarks can be encrypted before they are inserted into the code. The following is an example of a scheme for producing encrypted watermarks that appear to be random byte strings, even if the watermark messages have the same contents. Each watermark message is encoded into a sequence of byte strings as shown in FIG. 24. In FIG. 24, tag is a one-byte prefix common to all watermarks in the code. This one-byte prefix may be specified by the user, or may be derived from encryption key by a means known in the art, such as, for example, from the application of a one-way hash function to the encryption key or to a character string containing the encryption key, or from a random number generator whose seed is the encryption key. With only one byte, the tag effectively limits the search space for true watermarks without compromising its random-looking appearance. In FIG. 24, sh f is a two-byte number that is unique for each of the watermarks, which may be extended to be four-bytes long if a large number of watermarks are to be encrypted. It is this number that gives messages of same content different appearances, by first masking their content and length using the same number (denoted as "msg+sh f" and "len+sh f") before they are encrypted. In FIG. 24, E(M) denotes an encrypted version of string M. E(M) can be decrypted only by using a secret key known only to the party who encrypted the message.

Given that directly attacking some highly guarded application software program code is difficult, there is a type of attack that could easily bypass the guards by attacking the "neighbors" of the guarded code instead. This type of attack is called "clone attack," in which clones of the code blocks are first produced, then compromised, and finally merged into the application software program code, substituting for the original target code blocks, which are left intact but no longer execute during program execution.

Figure 25:
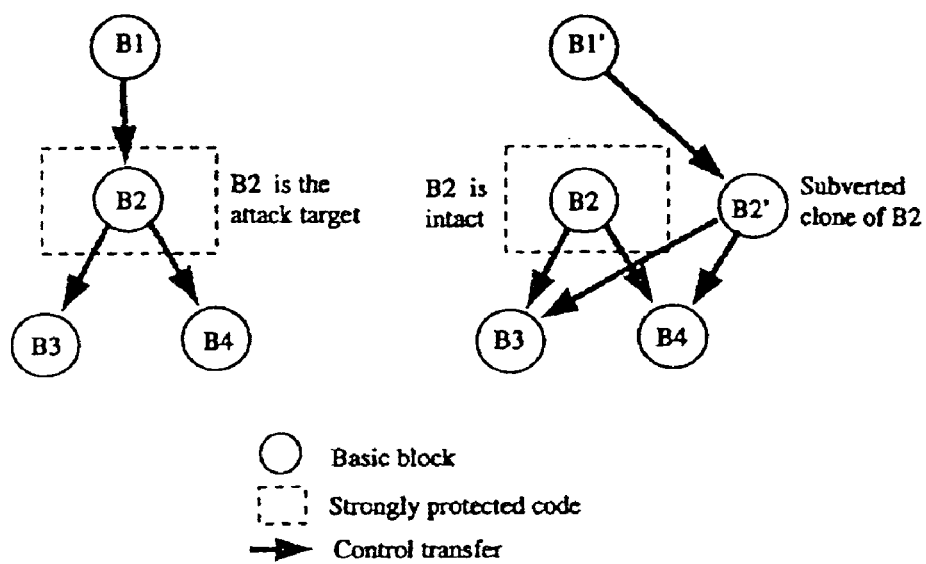
FIG. 25 shows an example of a clone attack.

FIG. 25 shows an example of a clone attack. In FIG. 25, the attack target, basic block $B_2$, is highly protected but its predecessor, basic block $B_1$, is not protected at all. In this case, an attacker can easily produce $B'_2$, a clone of $B_2$, as an extension of the program. $B'_2$ then becomes the attack target without any protection. To make the compromised $B'_2$ a part of execution, the hacker redirects the transfer of control from $B_1$ to flow into $B'_2$, which then reroutes the flow back to $B_3$ and $B_4$. The example above states the fact that a guard protection scheme can be bypassed easily if the protection range misses the "weak points" in its control-flow predecessors.

Several preventive measures may prevent clone attacks. First, install into the client code blocks special guards that monitor whether the application software program code has become a cloned copy of the original. These guards are units of code that use methods known in the art to check if some code relative to their current locations (the "code protection range") is different from before. They monitor their environments for clues about their positioning.

A second preventative measure is to enlarge the code protection range so that the range covers a larger number of predecessors of the originally protected code. This allows more guards to be installed within the range and increases the cost of tampering the region.

A third preventative measure is to obscure by code obfuscation techniques the control flow both preceding and within the code protection range as much as possible. This is to prevent an hacker from knowing the locations of the immediate predecessors of his original target since these predecessors must be modified in order to transfer control to the clone.

A final preventative measure is to avoid placing critical code containing sensitive instructions or data near the beginning of the execution flow, where it is not reachable from the rest of the code, since such code contains a limited number of basic blocks and is very vulnerable to clone attacks.

Figure 26:
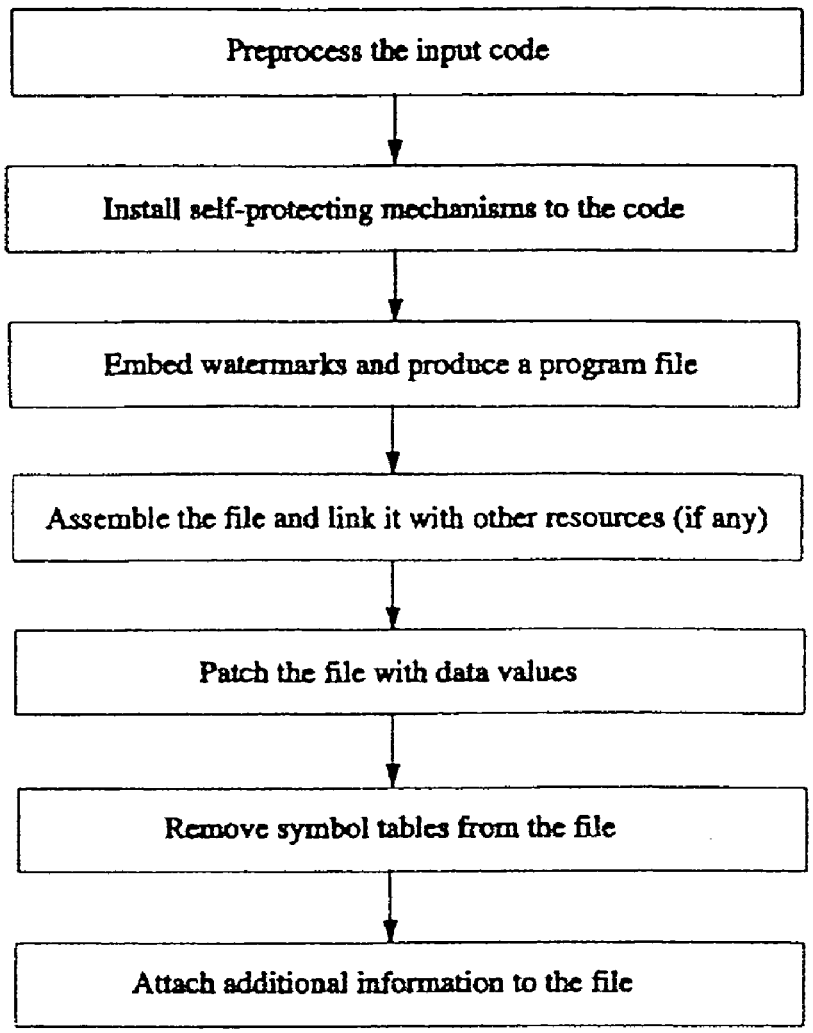
FIG. 26 shows one embodiment of the method of the present invention.

One embodiment of the method of installing SPC according to the present invention is shown in FIG. 26. The method begins with a set of host application software program files written in an assembly language. The first step shown in FIG. 26 is preprocessing the input code from the host application assembly language software program files to enable efficient code transformations at a later stage of the process. The step is comprised of two concurrent operations. First, a combined CFG is built from the set of assembly language software program files. At the same time, instructions within the assembly language software program files containing high-level semantics are replaced by groups of simpler instructions with the equivalent semantics. The table in FIG. 27 illustrates several examples where the high-level semantics shown in the left column of the table are replaced by groups of simpler instructions with the same semantics shown in the right column. INTEL® assembly code is used in FIG. 27, however the method of the present invention will work equally well with other, different hardware architectures and assembly language code.

The second step shown in FIG. 26 involves installing self-protecting mechanisms. Self-protection is achieved by installing at least one guard into the host application assembly language software program code. Self-protection may be enhanced by installing more than one guard to form a distributed network of guards that cooperatively defend the host application software program from modification. Further enhancement of self-protection may be achieved by applying a sequence of simple obfuscating transformations to the host application assembly language software program code that render the code unintelligible without compromising its functionality.

In the embodiment of the present invention shown in FIG. 26, three distinct operations comprise the step of installing self-protection mechanisms. First, the host application assembly language software program code is obfuscated to disguise the appearance of the original code as much as possible before the installation of guards. Second, at least one guard is installed into the obfuscated code according to a protection scheme that may be given by the user, or may be generated automatically. Third, the code undergoes a second obfuscation operation to blend the guard code with the host application assembly language software program code.

The third step shown in FIG. 26 involves embedding at least one watermark and producing a software program file. At least one watermark is embedded into the application assembly language software program code and protected by guards. After watermark insertions, a randomized listing of the software program basic blocks is written to a new file, which is to be assembled in the next stage. The new randomized listing will not rearrange the basic blocks that have already been protected, as they were grouped together and their relative positions were fixed during the previous guard installation stage. This avoids unexpected changes in values of parameters belonging to the guards already installed in the host application assembly language software program code.

The fourth step shown in FIG. 26 involves assembling the file and linking the file with other resources. The new assembly file produced from the previous stage is assembled and its object file may be linked with other object files or libraries in order to produce a preliminary binary executable image.

The fifth step shown in FIG. 26 involves patching the preliminary binary executable image with data values which the guards will use in determining checksum correctness. During the previous installation of guards some binary information, for example, checksums of client code blocks in the finalized image, was not available and corresponding slots in the code for storing the values were left unfilled. This stage, therefore, computes the missing values based on the preliminary binary executable image and then patches them into the unfilled slots in the file.

The patching process is comprised of several steps. First, an external simulator program of a type well known in the art is used to execute the checksumming template of each installed guard, deriving one or more checksums for each guarded client code block in the preliminary binary executable image. This checksum is known as the "checksum constant" of the client code block. In one embodiment of the present invention, the checksum constants are patched into the file in the appropriate place in the preliminary binary executable image, and used by the guards to compare dynamically the checksums computed by the checksumming templates during program execution. In another embodiment of the present invention, a subset of the checksum constants, with each subset containing at least one checksum constant, are used to drive a functional algorithm which derives other values that in turn are patched into the file in the appropriate place in the preliminary binary executable image. These derived values and the functional algorithm are used by the guards to compare dynamically the checksums computed by the checksumming templates during program execution. To ensure that checksums are computed correctly, the order in which values are patched to the preliminary binary executable image follows the sequence of guard creations. This stage produces a binary executable application software program.

The sixth step shown in FIG. 26 involves removing symbol tables from the binary executable application software program. All symbol tables in the finalized code are removed. Their presence may give hints to attackers about the underlying self-protecting mechanisms.

The final step shown in FIG. 26 involves attaching additional information to the binary executable application software program file. For the convenience of both the vendor and users of the self-protecting software program, a digital signature of the file and any encrypted customization parameters used in the installation process, may be attached to the end of the file as shown in FIG. 28.

The digital signature provides an option for an application software program user to verify integrity of an application software program that came from an unknown, possibly hostile source. There are many digital signature schemes available, any of which can be applied here. For example, digital signatures by public-key cryptography and one-way hash functions may be used. Note that the digital signature may cover both the software program code (the first portion of the file) and any encrypted customization parameters (the second portion).

Customization parameters are encrypted by using a secret key known only to the vendor or author of the software program. The specific set of customization parameters that guided the installation process may be stored in the same file for future reference. There may be no need for the vendor to store the parameters in a database.

FIG. 29 shows a table illustrating the actions of a hypothetical self-protecting software program which produces incorrect results whenever its code is altered, even on inserting a single null instruction into the code. The table in FIG. 29 illustrates a self-protecting software program requires the correct password "opensesame" to generate the next prime number of a given number. The left column of the table in FIG. 29 illustrates the execution of the unaltered self-protecting software program, first when the wrong password is used and then when the correct password is used. The right column of the table in FIG. 29 illustrates the operation of the self-protecting software program after it has been altered by a hacker. On the first use, the altered self-protecting software program returns an erroneous value which may or may not be apparent to the hacker. After further alterations by the hacker, the altered software program terminates unexpectedly.

Figure 30:
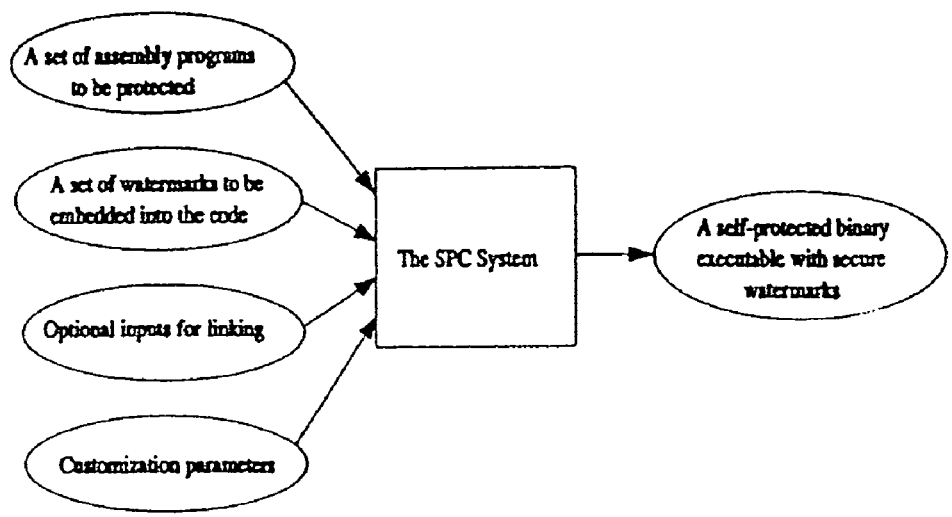
FIG. 30 shows a block diagram illustrating the operation of one embodiment of a system for creating a tamper resistant application software program according to the present invention.

FIG. 30 shows a block diagram illustrating the operation of one embodiment of a system for creating tamper resistant software according to the present invention. The box in FIG. 30 labeled "The SPC System" represents a software program for creating a tamper resistant application software program according to the present invention. The SPC System receives the input necessary to carry out the present invention, the input including but not limited to: (1) At least one assembly language software program to be protected, (2) A set of watermarks to be embedded into the assembly language software programs, (3) A set of object files or libraries with which the set of assembly language software programs will be linked, and (4) The customization parameters required by the present invention. The SPC System possesses a means for receiving more than one assembly language software program file as an input, including a means known in the art for resolving conflicting entity names may which may appear in different assembly language software program files, and a means known in the art for combining the more than one assembly language software program files. The SPC System installs Self-Protecting Code into the assembly language software programs in accordance with the present invention. The output of The SPC System will be a self-protecting binary executable software program with secure watermarks.

In one embodiment, the present invention may include a software means known in the art for storing references to code blocks within an application software program to be protected by guards, and a means for later retrieving the stored references to the code blocks. Such means will improve the efficiency of the present invention when the present invention is used by a user to protect an application software program which is under development. The user will not be required to identify code blocks to be protected each time the application software program is built from its component program files.

In one embodiment, the present invention may include a data storage and retrieval means known in the art for storing references to the guards installed in an application software program, and a means for later retrieving the stored references to the guards. Such means will improve the efficiency of the present invention when the present invention is used by a user to protect an application software program which is under development. The user will not be required to reinstall guards each time the application software program is built from its component program files.

In one embodiment, the present invention may provide the user the option of specifying a desired level of protection for the application software program. For example, the user may specify that the software protection level be "low," "medium," or "high," or the user may specify the exact number of guards to be installed, and/or may specify the complexity of the guards to be installed. Additionally or alternatively, the user may specify that the code obfuscation level be "low," "medium," or "high." Such specifications may be made through a user interface. The present invention will be operable to accept these user specifications and generate a self-protecting binary executable software program in accordance with these user specifications, by, for example, varying the number and complexity of the embedded guards.

In one embodiment, the present invention is operable to receive an application software program, and to create protected copies of the executable version of the application software program which are protected differently. Differently protected copies of the application software program are achieved by varying the application of one or more of the different methods disclosed herein. For example: (i) different client code blocks in each copy of the application software program may be selected; (ii) different guard formations may be installed in each copy of the application software program; (iii) different checksumming templates may be installed in each copy of the application software program; (iv) the same checksumming template may be installed in each copy of the application software program, but the location within the application software program code where the checksumming template is installed may be different in each copy of the application software program; (v) different conditional identities may be installed in each copy of the application software program; (vi) the conditional identities may be installed in different locations in each copy of the application software program; (vii) different code obfuscation techniques, in different sequences, and for different numbers of iterations may be applied to each copy of the application software program; (viii) where CFG-merging is employed, different code blocks in each copy of the application software program may be selected for merging; (ix) where CFG-cloning is employed, different basic blocks in each copy of the application software program may be selected for cloning; (x) where data-aliasing is employed, different constant data values in each copy of the application software program may be selected; (xi) where data precomputation is employed, different computations for initializing the variables to be precomputed may be installed into the application software program code; (xii) the basic blocks of the application software program may be arranged in a different sequence in each copy of the application software program; (xiii) different watermarks may be installed in each copy of the application software program; and/or (xiv) the same watermark may be installed in each copy of the application software program, but the location within the application software program code where the watermark is installed may be different in each copy of the application software program. Other ways of varying the application of one or more of the different methods disclosed herein for the purpose of generating differently protected copies of the application software program may be used in addition to, or in lieu of, the foregoing examples.

This embodiment of the present invention also may include a means for providing the user the option of protecting each copy of the application software program differently. If the user so opts, this embodiment may generate the differently protected copies of the application software program randomly and automatically, or may provide the user with the ability to generate the differently protected copies of the application software program under the control of the user. If the user does not desire differently protected copies of the application software program, this embodiment may be operable to create identically protected copies of the application software program randomly and automatically, or may provide the user with the ability to generate the identically protected copies of the application software program under the control of the user.

The present invention may be integrated with a source code compiler software program or a linker software program used in the art to generate assembly language and/or binary executable software programs from application software program source code written in a high level programming language. In this embodiment the user may, optionally, select through a user interface those portions of the high level application software program source code to be protected, such as, for example, specific procedures, functions, routines, or lines of code, by at least one guard before compiling the application software program, and the compiler and present invention will be operable to generate a self-protecting binary executable software program with guards installed in the locations in the binary executable code which correspond to the designated locations in the high level source code.

The method and system of the present invention provide a method and a system for protecting a software application program from unauthorized modification which does not require special hardware, self-modifying code, or code encryption and decryption. The method and system do not require special operating system features for proper execution. The method and system may produce subtle errors rather than immediate program failure, thereby hindering the efforts of hackers to pirate the software.

The system of the present invention may be incorporated into or integrated with a programming language compiler for automatically generating self-protecting software programs, providing enhanced advantages for an author or vendor of a software program.

Those of skill in the art will appreciate that the various means recited herein and in the claims may be performed by computer software and/or computer hardware. Preferably, such computer software may be written in a high-level programming language such as, for example, Java, C, C++, Pascal, or Fortran.

While this invention has been described as having a preferred design, the present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. Method of protecting host application code comprising a plurality of code blocks using a self-protecting code system, the method comprising:

preprocessing the host application code using a computer programmed with the self-protecting code system and storing the host application code in a memory accessible by the computer;

obfuscating the host application code using the computer programmed with the self-protecting code system;

installing a guard in the host application code to protect a client block using the computer programmed with the self-protecting code system, the client block being at least one code block;

randomly rearranging the code blocks of the host application code without rearranging the code blocks that have already been protected using the computer programmed with the self-protecting code system;

linking the rearranged host application code with other resources to produce a binary executable image using the computer programmed with the self-protecting code system; and patching the binary executable image with data values to be used by the guard using the computer programmed with the self-protecting code system and storing the binary executable image after patching the binary executable image;

wherein installing a guard comprises:

mapping parameters in a guard template to variables and values in the host application code to create guard code, installing the guard code in the host application code;

selecting an expression in the host application code to be modified by the guard;

inserting a conditional identity function into the selected expression in the host application code, the conditional identity function including checksum variables and corresponding constant values;

rewriting the selected expression to conceal the checksum variables;

marking the corresponding constant values to be derived from the checksum variables; and saving a sequence of operations for deriving the corresponding constant values from the checksum variables.

2. The method of claim 1, wherein the preprocessing step comprises
building a combined control flow graph for the host application code; and
replacing instructions within the host application code containing high-level semantics with groups of simpler instructions that perform the equivalent function.

3. The method of claim 1, wherein the step of obfuscating the host application code occurs prior to the step of installing a guard; and a second step of obfuscating the host application code occurs following the step of installing a guard to obfuscate at least one of the host application and the guard.

4. The method of claim 1, wherein the step of installing a guard further comprises:
using a plurality of guards;
saving a guard template for each guard to be installed; and
installing the plurality of guards to form a distributed network of guards that cooperatively protect the host application code and each other.

5. The method of claim 1, wherein the step of installing a guard comprises:
using a plurality of guards;
selecting the client blocks to be protected by the guards;
dividing each client block into sub-blocks;
rearranging the sub-blocks of each client block in a randomized order;
forming a contiguous code block from the rearranged sub-blocks of each client block;
assigning each of the plurality of guards to protect at least one code block;
selecting a guard template for each guard to be installed; and
installing each of the plurality of guards in a selected code block of the plurality of code blocks, the selected code block not being protected by a previously installed guard.

6. The method of claim 5, wherein the step of installing a plurality of guards is performed automatically using a guard formation graph; a first guard formation graph customization parameter, and a second guard formation graph customization parameter;

the guard formation graph including a plurality of client nodes, at least one client node being a root node;

the first guard formation graph customization parameter specifying the number of brigade nodes protecting each root node; and the second guard formation graph customization parameter specifying the number of additional brigade nodes to be added to the guard formation graph.

7. The method of claim 4, wherein the step of patching the binary executable image comprises:

deriving one or more checksum constants for each client block in the binary executable image; and patching each checksum constant into the appropriate location in the binary executable image.

8. The method of claim 7, wherein the step of patching each checksum constant comprises:

for at least one checksum constant, creating a functional algorithm which evaluates to the value of the checksum constant;

executing the functional algorithm; and patching the result of the functional algorithm into the appropriate location in the binary executable image.

9. The method of claim 1, wherein patching the binary executable image comprises:

retrieving the saved sequence of operations for deriving the checksum variables;

generating the marked corresponding constant values using the saved sequence of operations and the checksum variables; and inserting the generated corresponding constant values at the appropriate insertion points in the binary executable image, such that, during execution of the binary executable image, the checksums are compared with the generated corresponding constant values to detect modification and initiate defensive action.

10. The method of claim 1, wherein the obfuscating step comprises:

identifying a set of candidate blocks having the same program instructions in the same order with possibly conflicting parameter values;

selecting candidate blocks that do not share a predecessor block with any other candidate block of the set of candidate blocks, and are not a predecessor of itself or of any other candidate block of the set of candidate blocks;

for each candidate block that has no predecessor block, creating an empty code block as the predecessor block of that candidate block;

merging the set of candidate blocks into a merged block;

updating control flow instructions in the predecessor blocks of each of the candidate blocks to direct control flow to the merged block;

identifying each conflicting set of values in the set of candidate blocks, including any successor flow value that directs control flow from the merged block to the appropriate successor block for each candidate block of the set of candidate blocks;

assigning an assigned variable to each conflicting set of values;

pre-computing the set of conflicting values for each assigned variable; and initializing each assigned variable in the host application code to contain the appropriate value from the set of conflicting values before use of the assigned variable by the merged block.

11. The method of claim 10, wherein the initializing each assigned variable step comprises:

for each candidate block, determining an appropriate value for each assigned variable, the appropriate value being one of the values from the conflicting set of values for the assigned variable; and for each assigned variable and each candidate block, installing a computation that will evaluate to the appropriate value for the assigned variable before the assigned variable is used in the merged block.

12. The method of claim 1, wherein the obfuscating step further comprises:

selecting a potential block having a plurality of unmerged predecessor blocks and a single successor block;

creating a clone block for the potential block, the clone block having functionally equivalent code to the potential block;

updating a subset of the plurality of predecessor blocks to direct control flow to the clone block instead of the potential block; and rewriting the code of the clone block to recast the clone block to have a different look than the potential block.

13. The method of claim 1, wherein the obfuscating step further comprises:

selecting a potential block having a plurality of unmerged predecessor blocks and a single successor block;

creating a clone block for the potential block, the clone block having functionally equivalent code to the potential block;

updating a subset of the plurality of predecessor blocks to direct control flow to one of the clone block and the potential block based on a randomized condition; and rewriting the code of the clone block to recast the clone block to have a different look than the potential block.

14. The method of claim 1, wherein the obfuscating step further comprises:

selecting an aliasing constant in the host application code;

assigning an assigned variable to the aliasing constant;

substituting a mathematical expression using the assigned variable for at least one occurrence of the aliasing constant, the mathematical expression evaluating to the assigned variable;

computing the value of the assigned variable necessary for the mathematical expression to evaluate to the value of the aliasing constant; and initializing the assigned variable to the necessary value in the code prior to the mathematical expression such that the assigned variable will have the necessary value when used in the mathematical expression.

15. The method of claim 1, further comprising embedding at least one watermark into the host application code.

16. The method of claim 15, further comprising protecting the embedded watermark with at least one guard.

17. The method of claim 1, further comprising embedding a plurality of watermarks in the host application code using a sequence of byte strings created by the steps of:

creating a common prefix, the common prefix being common to all watermarks in the host application code;

then performing the following steps for each watermark, creating a unique field, the unique field being different for each watermark;

computing the combined length of the watermark plus the unique field;

encrypting the value of the combined length of the watermark plus the unique field;

creating a first string comprising the unique field appended to the watermark;

encrypting the first string;

creating a second string comprising the common prefix, the unique field, the encrypted combined length, and the encrypted first string; and embedding the second string in the host application code.

18. The method of claim 1, wherein the binary executable image includes symbol tables, and the method further comprises:

removing the symbol tables from the binary executable image.

19. The method of claim 1, further comprising:

attaching a digital signature of the binary executable image and any encrypted customization parameters used in the installation process to the binary executable image.

\* \* \* \* \*